(12) United States Patent
Minamio et al.

(10) Patent No.: US 7,817,204 B2
(45) Date of Patent: Oct. 19, 2010

(54) OPTICAL DEVICE MODULE AND METHOD FOR FABRICATING THE SAME

(75) Inventors: Masanori Minamio, Osaka (JP); Yutaka Harada, Kyoto (JP); Takahito Ishikawa, Kyoto (JP); Toshiyuki Fukuda, Kyoto (JP); Yoshiki Takayama, Shiga (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 11/979,122

(22) Filed: Oct. 31, 2007

(65) Prior Publication Data

US 2008/0117324 A1 May 22, 2008

(30) Foreign Application Priority Data

Nov. 20, 2006 (JP) .............................. 2006-312543

(51) Int. Cl.
*H04N 9/07* (2006.01)
*H04N 5/225* (2006.01)
*H04N 9/09* (2006.01)

(52) U.S. Cl. ..................... 348/337; 348/340; 348/262; 348/264

(58) Field of Classification Search ................. 348/337, 348/340, 262, 264
See application file for complete search history.

(56) References Cited

U.S. PATENT DOCUMENTS 3,590,145 A * 6/1971 Schneider et al. ........... 348/258
4,216,494 A * 8/1980 Ohshima et al. ............ 348/259
4,236,177 A * 11/1980 Ohshima et al. ............ 348/259
4,589,015 A * 5/1986 Nakata et al. ............... 348/259
4,857,997 A * 8/1989 Fukami et al. .............. 348/338
4,916,534 A * 4/1990 Takhashi et al. ............. 348/67
5,042,913 A * 8/1991 Yamamoto .................. 359/540
5,730,701 A * 3/1998 Furukawa et al. ........... 600/127
5,760,832 A * 6/1998 Yamanaka et al. .......... 348/264
6,667,656 B2 * 12/2003 Saita .......................... 359/634
7,359,122 B2 * 4/2008 Ring et al. .................. 359/634
2003/0193609 A1* 10/2003 Kothmeier .................. 348/340

FOREIGN PATENT DOCUMENTS

| JP | 56-098881 | 8/1981 |
| JP | 11-271646 | 10/1999 |
| JP | 2000-210252 | 8/2000 |

* cited by examiner

*Primary Examiner*—James M Hannett
(74) *Attorney, Agent, or Firm*—McDermott Will & Emery LLP

(57) ABSTRACT

A solid-state image sensor includes a first image sensing device, a first flexible substrate connected to the first image sensing device, a second solid-state image sensing device, and a second flexible substrate connected to the second solid-state image sensing device. The solid-state image sensing devices are disposed adjacently to each other such that light receiving surfaces are perpendicular to each other. The second solid-state image sensing device directly receives incident light. However, the first solid-state image sensing device receives the incident light reflected by a mirror. Electronic components are mounted on the two flexible substrates. The first flexible substrate is bent at two bending positions to face the second flexible substrate and electrically connected thereto.

17 Claims, 15 Drawing Sheets

OPTICAL DEVICE MODULE AND METHOD FOR FABRICATING THE SAME

CROSS-REFERENCE TO RELATED APPLICATION(S)

This application claims priority under 35 U.S.C. §119(a) on Japanese Patent Application No. 2006-312543 filed on Nov. 20, 2006, the entire contents of specification, drawings and claims of which are hereby incorporated by reference.

BACKGROUND OF THE INVENTION

1. Field of the Invention

The present invention relates to an optical device module and a method for fabricating the same. Specifically, the present invention relates to an optical device module including a plurality of optical devices, flexible substrates connected to the optical devices, and electronic components mounted on the flexible substrates and to a method for fabricating the same.

2. Description of the Prior Art

In recent years, optical device modules have been developed in which an optical device having a light receiving/emitting function and a drive circuit for the optical device are integrated. Examples of such an optical device module include optical pickups used as for reading DVDs with the optical device and camera modules for mobile phones. There is a demand for these optical device modules to be downsized according to size reduction of built-in components.

More specifically, examples of the above optical device module are solid-state image sensors (image sensing modules) using as an optical device a solid-state image sensing device, such as a charge-coupled image sensing device (CCD), a static induction transistor image sensing device (SIT) or a charge modulation image sensing device (CMD). These solid-state image sensors are often built in compact camera units. These solid-state image sensors are used in a manner incorporated in a hardened tip of an insertion tube inserted in the compact camera unit. Such a compact camera unit is demanded to have a tip shorter and narrower in outer diameter because of use in archeological excavation, for search for narrow spaces in disasters and for internal investigation of artifacts. From this point of view, it is important how a solid-state image sensor is downsized. In addition, in order to release compact camera units at low price, it is also an important challenge to improve the assembly efficiency of solid-state image sensors and thereby save the production cost.

There is known a solid-state image sensor intended to attain size reduction and cost saving, wherein leads on a flexible substrate having an IC and a chip component mounted thereon are bent and connected to bumps on a particular edge of a solid-state image sensing device and the back surface of the IC is adhered to the back surface of the solid-state image sensing device (see, for example, Japanese Laid-Open Patent Publication No. 11-271646).

FIG. 14 is a conceptual cross-sectional view showing the structure of the known solid-state image sensor disclosed in the above document.

As shown in FIG. 14, first, a solid-state image sensing device 902, a semiconductor device (an IC chip) 903, a chip component 904 are mounted on a flexible substrate 901 and the flexible substrate 901 is connected to external signal lines 905. Thereafter, the flexible substrate 901 is bent at right angles at three locations so that the bottom surface of the solid-state image sensing device 902 and the top surface of the IC chip 903 are opposed to each other. Both the surfaces are adhered to each other by an adhesive 922. Then, the side surfaces of the chip component 904 are adhered to opposed parts of the bent substrate 901 by unshown adhesive. In this manner, a solid-state image sensor for an electronic endoscope is formed with a compact configuration. The above Japanese Laid-Open Patent Publication No. 11-271646 describes that since the solid-state image sensor is configured by bending the flexible substrate 901 in a rectangular shape and adhering the back surfaces of the IC chip 903 and the solid-state image sensing device 902 to each other, this provides size reduction and cost saving without deteriorating working efficiency.

There is also known another solid-state image sensor intended to attain size reduction, wherein a flexible substrate is bent in the shape of a box, electronic components are mounted on the flexible substrate inner surfaces of the box shape and a solid-state image sensing device is connected to terminals on the bottom of the flexible substrate (see, for example, Japanese Laid-Open Patent Publication No. 2000-210252). The Japanese Laid-Open Patent Publication No. 2000-210252 describes that since the flexible substrate is bent in the shape of a box all surfaces of which are rectangular and electronic components are mounted on the substrate inner surfaces of the box shape, the image sensing unit can be downsized, thereby narrowing and downsizing the endoscope tip.

Each of the two solid-state image sensors mentioned above includes one solid-state image-sensing device and can produce only monochrome images.

However, color images are required for archeological excavation, for search for narrow spaces in disasters and for internal investigation of artifacts. Moreover, it is required to mount an infrared light source or a laser light source for length measurement together with a solid-state image sensor. In such a case, it is necessary to mount a plurality of solid-state image sensing devices on one camera unit, and to mount a light source together. If the solid-state image sensors of Japanese Laid-Open Patent Publication Nos. 11-271646 and 2000-210252 including a plurality of solid-state image sensors are used, or a light emitting element is mounted together to form a camera unit, the size of the camera unit itself increases. This is because the plurality of image sensors are used although each image sensor is small. Moreover, it is very difficult to provide the solid-state image sensing devices in a lens-barrel accurately adjusting such that optical axes of the solid-state image sensing devices coincide with each other.

Japanese Laid-Open Patent Publication No. 56-98881 discloses a solid-state image sensor in which three solid-state image sensing devices are combined but provides no description as to a peripheral circuit for driving these solid-state image sensing devices. In an actual solid-state image sensor, it is necessary to integrally build in a lens-barrel the solid-state image sensing devices and a wiring substrate having the drive circuit mounted thereon. Japanese Laid-Open Patent Publication No. 11-271646 and Japanese Laid-Open Patent Publication No. 2000-210252 disclose a technique to make these integrated components compact. However, a technology to make a plurality of adjacent solid-state image sensing devices and a wiring substrate compact has not been disclosed.

SUMMARY OF THE INVENTION

An object of the present invention, which was made in view of the problems mentioned above, is to provide an optical device module including a plurality of adjacent optical devices, flexible substrates electrically connected to the optical devices, and electronic components mounted on the flexible substrates and thereby realizing the reduced size and the lowered fabrication cost.

To solve the problems, an optical device module of the invention of the present application includes: a plurality of optical devices; a flexible substrate connected to the optical devices; an electronic component mounted on the flexible substrate; and a mirror or prism for changing a direction of an optical axis of at least one of the optical devices, wherein the flexible substrate includes a plurality of flexible substrates connected to different ones of the optical devices, the plurality of optical devices are adjacent to each other, the direction of the optical axis of the at least one of the optical devices changed by the mirror or prism is parallel to an optical axis of the other optical device, and at least one of the flexible substrates is bent to be electrically connected to the other flexible substrate.

Here, the description "the plurality of optical devices are adjacent to each other" is not limited to a case where the optical devices are in contact with each other but includes also a case where the optical devices are adjacent to each other through the prism or the mirror. Moreover, if the distance between portions of the two optical devices closest to each other is shorter than or equal to the length of the longest side of the optical devices, it can be considered that the optical devices are adjacent to each other.

Here, the description "the direction of the optical axis of the at least one of the optical devices changed by the mirror or prism is parallel to an optical axis of the other optical device" means that the relationship between optical axes of light entering the optical device module or exiting out of the optical device module is parallel. Here, the term "parallel" is not used in the mathematically strict sense, but means that the relationship has such a degree of parallelization that can be used for an optical device module, considering dimensional tolerance or election tolerance of components of the optical device module. The term "parallel" may include deviance from parallel in the mathematically strict sense to the extent that there is practically no problem.

In the above configuration, the incident light is divided by the mirror or prism to be assigned to the plurality of adjacent optical devices. The optical devices are connected to the flexible substrates on a one-to-one basis. Since the flexible substrates are connected to each other by bending at least one of the flexible substrates, the optical device module including the plurality of optical devices are made compact as a whole.

In a preferable embodiment, the plurality of optical devices include a first solid-state image sensing device and a second solid-state image sensing device, the two solid-state image sensing devices are connected to different ones of the flexible substrates, a first prism is fixed on a light receiving surface of the first solid-state image sensing device, a second prism is fixed on a light receiving surface of the second solid-state image sensing device, and the first and second prisms are fixed to each other.

The optical device module may further include a light emitting element, wherein an optical axis of light generated by the light emitting element and exiting out of the optical device module is parallel to an optical axis of a component of light entering at least one of the first and second prisms from the outside of the optical device module which is to enter the first and second solid-state image sensing devices in a direction parallel to optical axes of the first and second solid-state image sensing devices. Here, the description "exiting out of the optical device module" means that the light exits out of the optical device module. The description "an optical axis of a component of light entering . . . prisms" refers to the optical axis of a component of light from the outside of the optical device module first enters the prism.

The plurality of optical devices may further include a third solid-state image sensing device, another one of the flexible substrates is connected to the third solid-state image sensing device, a third prism is fixed on a light receiving surface of the third solid-state image sensing device, and the third prism is fixed to at least one of the first prism and the second prism.

The optical device module may further include a light emitting element, wherein an optical axis of light generated by the light emitting element and exiting out of the optical device module is parallel to an optical axis of a component of light entering at least one of the first, second, and third prisms from the outside of the optical device module which is to enter the first, second, and third solid-state image sensing devices in a direction parallel to optical axes of the first, second, and third solid-state image sensing devices.

Transparent protectors may be provided between the light receiving surfaces of the solid-state image sensing devices and the prisms.

Reinforcing resin may be provided on connection portions of the optical devices to the flexible substrates.

It is preferable that each of the flexible substrates is formed of a film carrier tape and at least a film is removed from connection portions of the optical devices to the flexible substrates.

At least one of the plurality of flexible substrates electrically connected to each other may include a bump electrode formed of a solder, and another one of the flexible substrates includes a through-hole in which the bump electrode is to be inserted.

Part of said another one of the flexible substrates may be folded, and the folded part has the through-hole.

Part of said another one of the flexible substrates may be folded, and the folded part has the bump electrode.

An electrode provided on another one of the flexible substrates may be electrically connected to the bump electrode.

The flexible substrates may be single-sided wiring substrates each having wiring only on one surface. In this case, it is preferable that part of at least one of the flexible substrates is folded such that surfaces where the wiring is not provided are laid on each other, and the folded part of the at least one of the flexible substrates has an external connection part for external connection.

The optical device unit of the present invention includes: the optical device module of claim 1; and a housing for accommodating the optical device module.

The housing may accommodate a heat liberation material at least the surface of which has electrical insulation.

A method for fabricating an optical device module of the present invention includes the steps of: mounting a plurality of electronic components on a first flexible substrate; connecting a first solid-state image sensing device to the first flexible substrate; mounting a plurality of electronic components on a second flexible substrate; connecting a second solid-state image sensing device to the second flexible substrate; disposing the first and second solid-state image sensing devices adjacently to each other; bending at least one of the first and second flexible substrates for connecting the flexible substrates to each other; and disposing a mirror or prism for changing a direction of an optical axis of the first solid-state image sensing device to be parallel to an optical axis of the second solid-state image sensing device.

DESCRIPTION OF THE PREFERRED EMBODIMENTS

Figure 1:
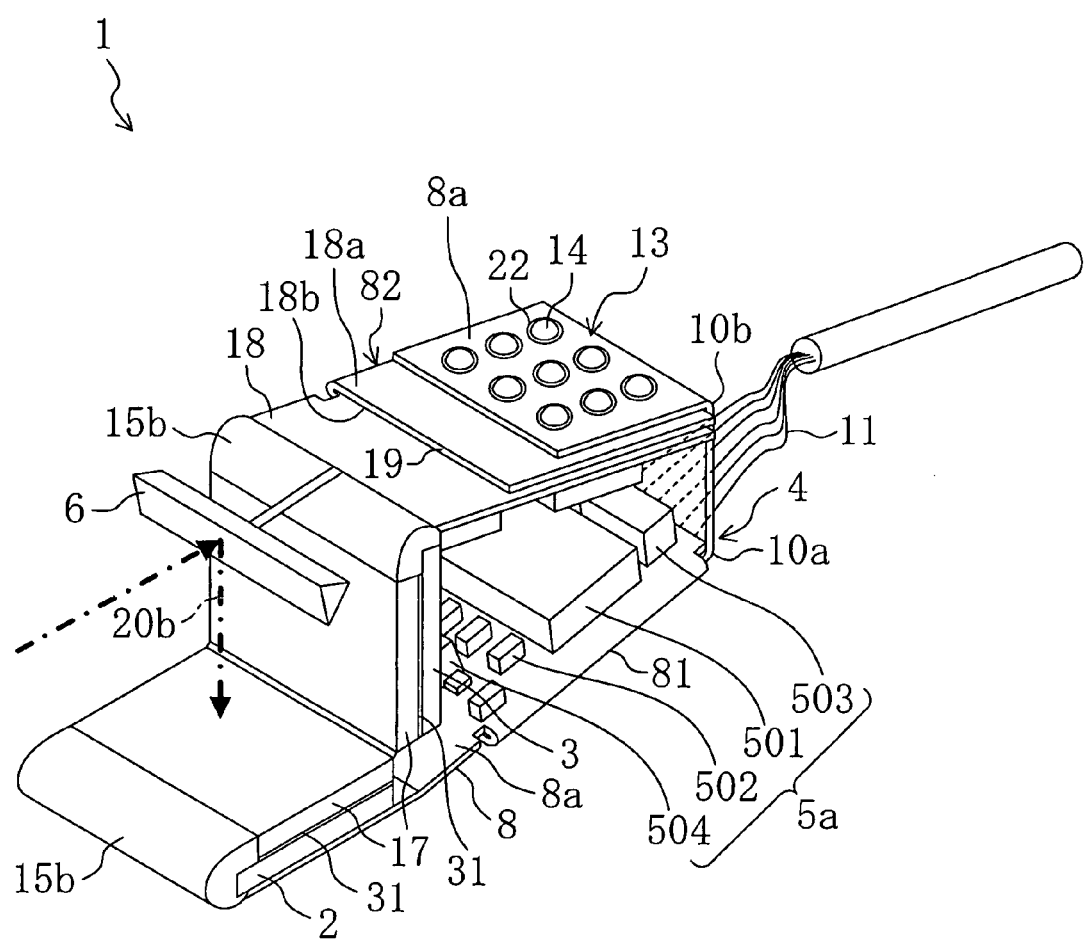
FIG. 1 is a perspective view schematically showing a solid-state image sensor of Embodiment 1.

A detailed description will be given below of embodiments of the present invention with reference to the drawings. For simplicity of explanation, elements having substantially the same functions are designated by the same reference numerals in the following drawings.

Embodiment 1

In Embodiment 1, descriptions are given of a solid-state image sensor (optical device module) having a solid-state image sensing device as an optical device and of a camera unit (optical device unit) having the solid-state image sensor built therein.

-Solid-State Image Sensor-

Figure 2A:
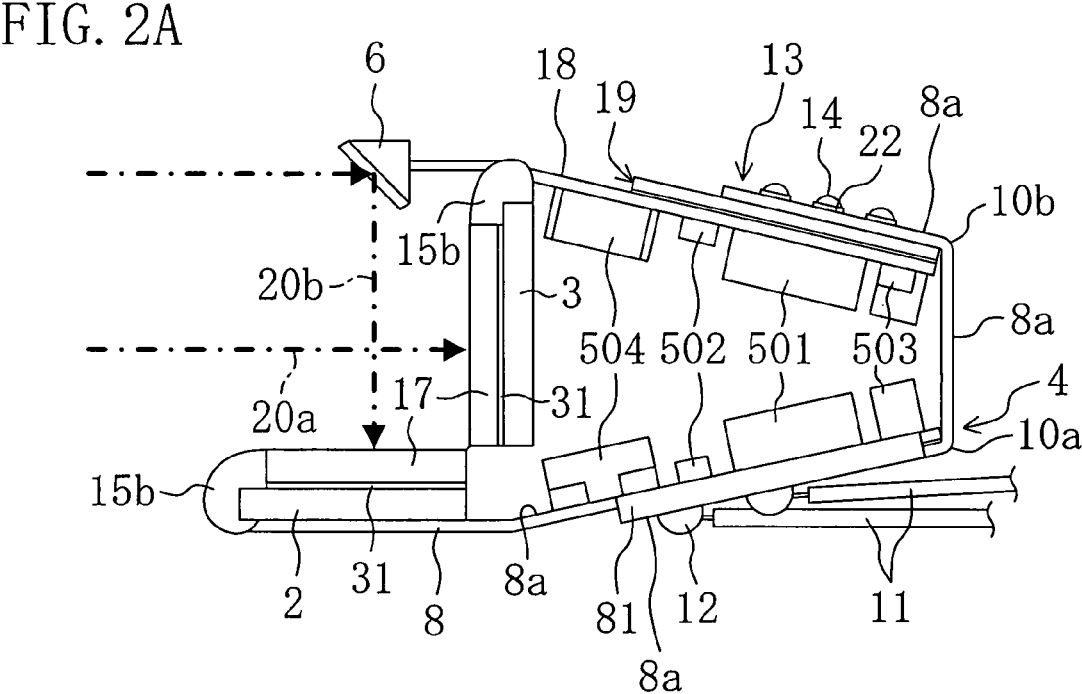
FIG. 2A is a side view schematically showing the solid-state image sensor of Embodiment 1.
Figure 2B:
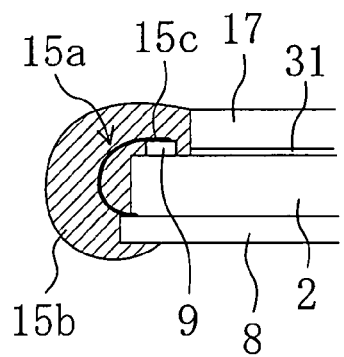
FIGS. 2B and 2C are partial cross sectional views of FIG. 2A.
Figure 2C:
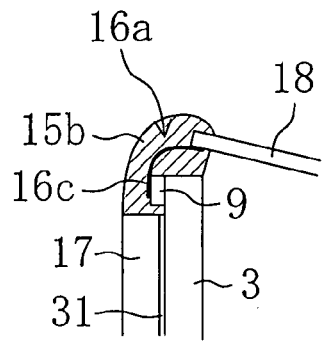

FIG. 1 is a perspective view and FIG. 2A is a side view schematically showing a solid-state image sensor of the present embodiment. FIGS. 2B and 2C are side surface cross sectional views showing connection portions of solid-state image sensing devices 2 and 3 respectively to flexible substrates 8 and 18.

A solid-state image sensor 1 of the present embodiment includes: first and second solid-state image sensing devices 2 and 3; first and second flexible substrates 8 and 18 electrically connected to the solid-state image sensing devices 2 and 3 respectively; and a mirror 6 for changing a direction of an optical axis of light which is to be incident on the first solid-state image sensing device 2. On the first and second flexible substrates 8 and 18, electronic components 5a are mounted. The first flexible substrate 8 is provided with external connection parts 12 to which external connection wires 11 are connected. The solid-state image sensor 1 is connected to a power supply via the external connection wires 11 for signal inputting/outputting.

In the present embodiment, the first and second solid-state image sensing devices 2 and 3 are provided by CCDs (charge-coupled image sensing devices). The first and second solid-state image sensing devices 2 and 3 respectively sense different colors, for example, red (R) and green (G) among the three primary colors of light.

On light receiving surfaces of the solid-state image sensing devices 2 and 3, transparent protectors 17 for protecting the light receiving surfaces are adhered by transparent adhesives 31. The transparent protectors 17 may be Telex (Registered Trademark) glass, Pyrex (Registered Trademark) glass, quartz, or the like. Moreover, the transparent adhesives 31 may be provided by an ultraviolet hardening type or heat hardening type material such as acryl-based resin, polyimide-based resin, or epoxy-based resin smaller in refractive index than the transparent protectors 17. The transparent protectors 17 protect the light receiving surfaces of the solid-state image sensing devices 2 and 3 from being covered with dust or damaged, which enhances the reliability and image quality. On outer edge portion of each of the light receiving surfaces, an element terminal 9 is provided.

The two solid-state image sensing devices 2 and 3 are adjacently fixed by using a fixing member (not shown) such that the light receiving surfaces are orthogonal to each other. In the present embodiment, the solid-state image sensing devices 2 and 3 are closely disposed to the extent that side end surfaces of the transparent protectors 17 of both of the solid-state image sensing devices 2 and 3 come into contact with each other. The light receiving surfaces of the solid-state image sensing devices 2 and 3 are open in forward directions, and external light enters the light receiving surfaces. The mirror 6 is provided in the forward direction of the light receiving surface of the first solid-state image sensing device 2. A direction of an optical axis 20b of light which is to enter the light receiving surface of the first solid-state image sensing device 2 is changed by the mirror 6 by 90°. Due to the mirror 6, the optical axis 20b of the light which is to enter the light receiving surface of the first solid-state image sensing device 2 become orthogonal to an optical axis 20a of light entering the light receiving surface of the second solid-state image sensing device 3. In other words, outside the solid-state image sensor 1, the optical axes of 20b and 20a of the two solid-state image sensing devices 2 and 3 coincide with each other. In this positional configuration, the two solid-state image sensing devices 2 and 3 are arranged in a very compact manner.

The first and second flexible substrates 8 and 18 are flexible dielectric substrates on surfaces of which metal wires (not shown) are provided. Specifically, the flexible substrates 8 and 18 of the present embodiment are single-sided wiring film carrier tapes where the substrates are formed of a polyimide film or a crystalline polymer film and the metal wires are copper. On principal surfaces 8a and 18a of the flexible substrates 8 and 18 having the metal wires, the electronic components 5a are mounted. Each of the electronic components 5a includes a driver IC 501 for driving the solid-state image sensing device 2 or 3, a chip resistor 502, a chip capacitor 503, a chip transistor 504, and the like constituting a drive circuit and an input/output circuit of the solid-state image sensing device 2 or 3. The electronic components 5a are electrically connected to the metal wires of the flexible substrates 8 and 18 by solders or the like.

The first flexible substrate 8 extends along a surface opposite to the light receiving surface of the first solid-state image sensing device 2 and is bent toward a light receiving surface side at a side end surface of the first solid-state image sensing device 2. As shown in FIG. 2B, to the element terminal 9 provided near the side end surface of the first solid-state image sensing device 2, a contact terminal portion 15c is connected by bump connection. The electronic components 5a are mounted on the first flexible substrate 8 at a rear side of a side end surface opposite to the side end surface of the solid-state image sensing device 2 provided with the element terminal 9.

A bent portion 15a and the contact terminal portion 15c of the first flexible substrate 8 which are bent toward the element terminal 9 of the first solid-state image sensing device 2 are formed of only the metal wire, with the film forming the substrate being removed. Therefore, the bent portion 15a and the contact terminal portion 15c are easily bent and easily kept in their bent shape. Therefore, the radius of curvature can be reduced, and it is possible to make the shape of the solid-state image sensor 1 compact. Moreover, around a connection portion of the element terminal 9 to the contact terminal portion 15c and around the bent portion 15a, reinforcing resin 15b is provided for protecting the connection portion and the bent portion. This improves connection reliability and makes it possible to fix the first flexible substrate 8 in its bent shape. The reinforcing resin 15b may be epoxy resin-based heat-hardening resin or the like.

As shown in FIG. 2C, one end of the second flexible substrate 18 is put on a side end part of the second solid-state image sensing device 3 and bent at a bent portion 16a toward a light receiving surface side. The one end of the second flexible substrate 18 is connected to the element terminal 9 of the second solid-state image sensing device 3 at a contact terminal portion 16c by bump connection. The first flexible substrate 8 is bent by about 180° to be connected to the first solid-state image sensing device 2, and the second flexible substrate 18 is bent by about 80° to be connected to the second solid-state image sensing device 3. Excepting the difference in bending angle, the first and second flexible substrates 8 and 18 have the same configuration of the connection portions.

Both of the first and second flexible substrates 8 and 18 extend in a rear surface (a surface opposite to the light receiving surface) side of the second solid-state image sensing device 3 and face each other. The surfaces facing each other are the principal surfaces 8a and 18a provided with the metal wires. On the principal surfaces 8a and 18a, the electronic components 5a are mounted. Each of the first and second flexible substrates 8 and 18 extending in the rear surface side of the second solid-state image sensing device 3 has a width substantially the same as the width of the rear surface of the second solid-state image sensing device 3. Therefore, if the second solid-state image sensing device 3 is seen from the light receiving surface side, the mounted electronic components 5a are hidden behind the second solid-state image sensing device 3, and thus the solid-state image sensor 1 is very compact.

Figure 3:
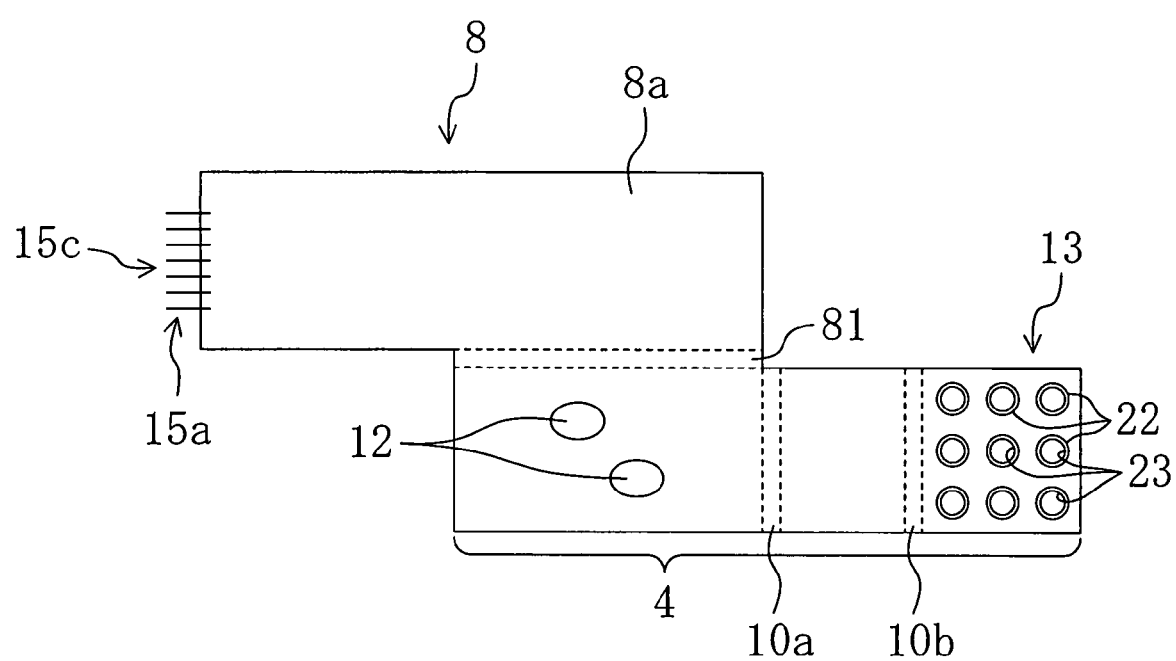
FIG. 3 is a developed view of the first flexible substrate of Embodiment 1.

Moreover, as shown in FIG. 3 which is a developed view, the external connection parts 12 of the first flexible substrate 8 are provided in a region 4 formed by folding part of the flexible substrate. That is, at a first folding position 81, the part of the flexible substrate is folded such that surfaces opposite to the principal surface 8a face each other. In this way, the metal wires (not shown) are partially disposed on a back side of the surface on which the electronic components 5a are mounted. For the metal wires disposed on the back side, the external connection parts 12 are formed. The external connection parts 12 are electrically connected to terminals of the electronic components 5a via the metal wires (not shown). Folding the flexible substrate as described above allows double-side disposition of the metal wires, and a compact double-sided wiring can be realized by using a low-cost single-sided wiring substrate.

Moreover, the region 4 formed by folding the first flexible substrate 8 further extends in a direction away from the rear surface of the second solid-state image sensing device 3 beyond a part where the electronic components 5a are mounted. The region 4 is folded at two positions, a first bending position 10a and a second bending position 10b, to form mountain creases on the principal surface 8a. A first connection region 13 beyond the second bending position 10b is disposed on a back surface side of the second flexible substrate 18 on which the electronic components 5a are mounted. The first connection region 13 is used for connection to the second flexible substrate 18. At this point, the principal surface 8a of the first connection region 13 is upward in FIG. 1. The first connection region 13 is provided with a plurality of through-holes 23. In the periphery of the through-holes 23 on the principal surface 8a, ring electrodes 22 are provided. Although not shown in the drawings, the ring electrodes 22 are connected to the external connection parts 12, the electronic components 5a, and the like via the metal wires formed on the principal surface 8a. Since the first and second flexible substrates 8 and 18 are electrically connected to each other in this way, the external connection wires 11 have only to be connected to the first flexible substrate 8. This makes it possible to reduce the number of connection wires and connection area, and thus the sensor is made compact and the cost is reduced.

Figure 4A:
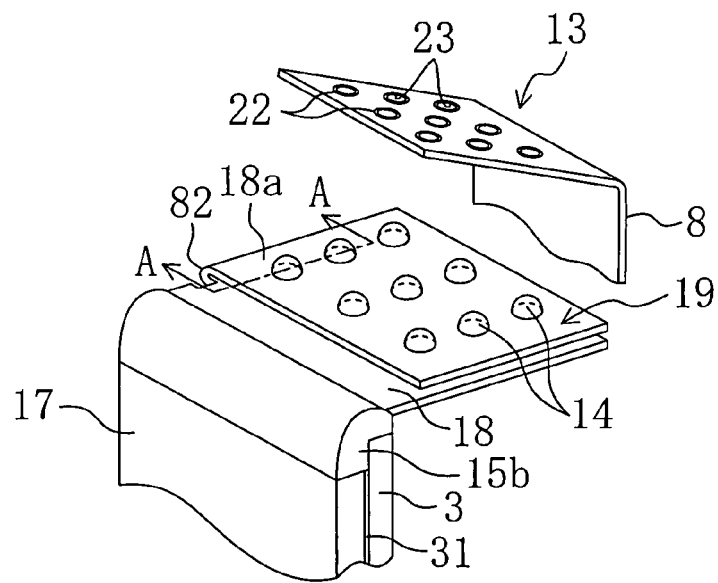
FIG. 4A is a perspective view showing first and second flexible substrates before connection to each other.
Figure 4B:
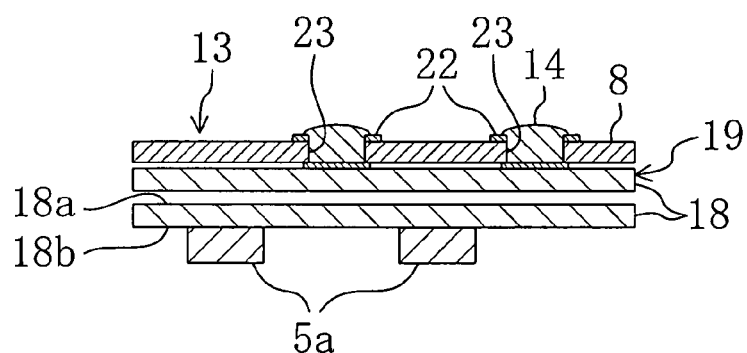
FIG. 4B is a cross sectional view after the connection taken along the line A-A of FIG. 4A.

Next, with reference to FIG. 4, descriptions are given below as to a structure of the connection portion between the two flexible substrates 8 and 18.

Part of the second flexible substrate 18 is folded at a second folding position 82 for connection to the first flexible substrate 8 such that surfaces (sub surfaces) 18b opposite to the principal surface 18a face each other. In a second connection region 19, which is the folded part, a plurality of solder balls (bump electrodes) 14 are formed and arranged. The solder balls 14 are electrically connected to the second solid-state image sensing device 3 and to the electronic components 5a on the second flexible substrate 18 by the metal wires (not shown) on the principal surface 18a.

The first connection region 13 of the first flexible substrate 8 is laid on the principal surface 18a of the second connection region 19 having the solder balls 14, so that upper portions of the solder balls 14 are partially inserted into the through-holes 23. That is, the solder balls 14 and the through-holes 23 are arranged in a matrix manner such that the solder balls 14 correspond to the through-holes 23 on a one-to-one basis. In this case, the ring electrodes 22 are provided on a surface opposite to a surface facing the solder balls 14. The solder balls 14 are melted by solder reflow to fill the through-holes 23 and further to be connected to the ring electrodes 22 in the periphery thereof for electrical connection. As described above, the two flexible substrates 8 and 18 are connected to each other by solder reflow firmly and certainly. Moreover, the solder balls 14 and the through-holes 23 can be easily aligned in position with each other, and connection step can be easily performed since solder reflow is a generally adopted method.

-Method for Fabricating Solid-State Image Sensor-

Figure 4C:
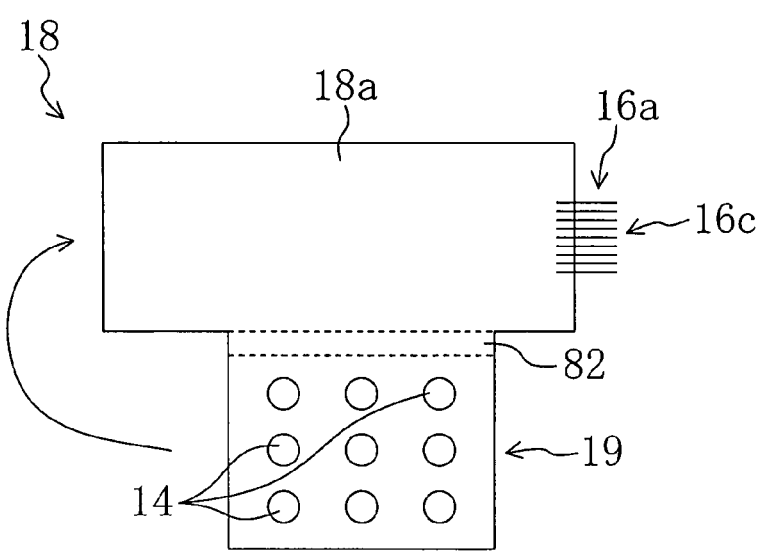
FIG. 4C is a developed view of the second flexible substrate.

A method for fabricating a solid-state image sensor 1 of the present embodiment begins with the step of first preparing a first flexible substrate 8 of FIG. 3 and a second flexible substrate 18 of FIG. 4C. The substrates 8 and 18 are formed by etching film carrier tapes. On one surface of each of the etched film carrier tapes, a copper film is adhered which is to be formed into metal wires. Moreover, in a second connection region 19 of the second flexible substrate 18, solder balls 14 are additionally formed.

Next, a plurality of electronic components 5a are mounted on the first flexible substrate 8, and a plurality of electronic components 5a are mounted on the second flexible substrate 18.

Then, the first flexible substrate 8 is connected to a first solid-state image sensing device 2 by bonding a contact terminal portion 15c to an element terminal 9. Then, the first flexible substrate 8 is bent at a bent portion 15a. Around the contact terminal portion 15c and the bent portion 15a, reinforcing resin 15b is provided by a syringe or the like. It is to be noted that transparent protectors 17 have been adhered on light receiving surfaces of the solid-state image sensing device 2 and a solid-state image sensing device 3.

Moreover, the second flexible substrate 18 is connected to the second solid-state image sensing device 3 by bonding a contact terminal portion 16c to an element terminal 9. Then, the second flexible substrate 18 is bent at a bent portion 16a. Around the contact terminal portion 16c and the bent portion 16a, reinforcing resin 15b is provided by a syringe or the like.

Then, the first flexible substrate 8 is folded at a first folding position 81 and substrate back surfaces are adhered to each other. Moreover, the second flexible substrate 18 is folded at a second folding position 82 and substrate back surfaces are adhered to each other.

Next, the first and second solid-state image sensing devices 2 and 3 are brought close to each other such that receiving surfaces thereof are orthogonal to each other and side end surfaces come into contact with each other, and fixed by a fixing member.

Thereafter, the first flexible substrate 8 is bent at two positions, a first bending position 10a and a second bending position 10b, to allow the first connection region 13 to face a second connection region 19. The positions of the solder balls 14 and the through-holes 23 are aligned with each other. Then, solder reflow is performed to connect the flexible substrates 8 and 18 to each other, with the connection regions 13 and 19 pushing against each other.

Then, in a forward direction of a light receiving surface of the first solid-state image sensing device 2, a mirror 6 is arranged. External connection wires 11 are connected to external connection parts 12 of the first flexible substrate 8.

In this way, the solid-state image sensor 1 is formed.

-Camera Unit-

Figure 5:
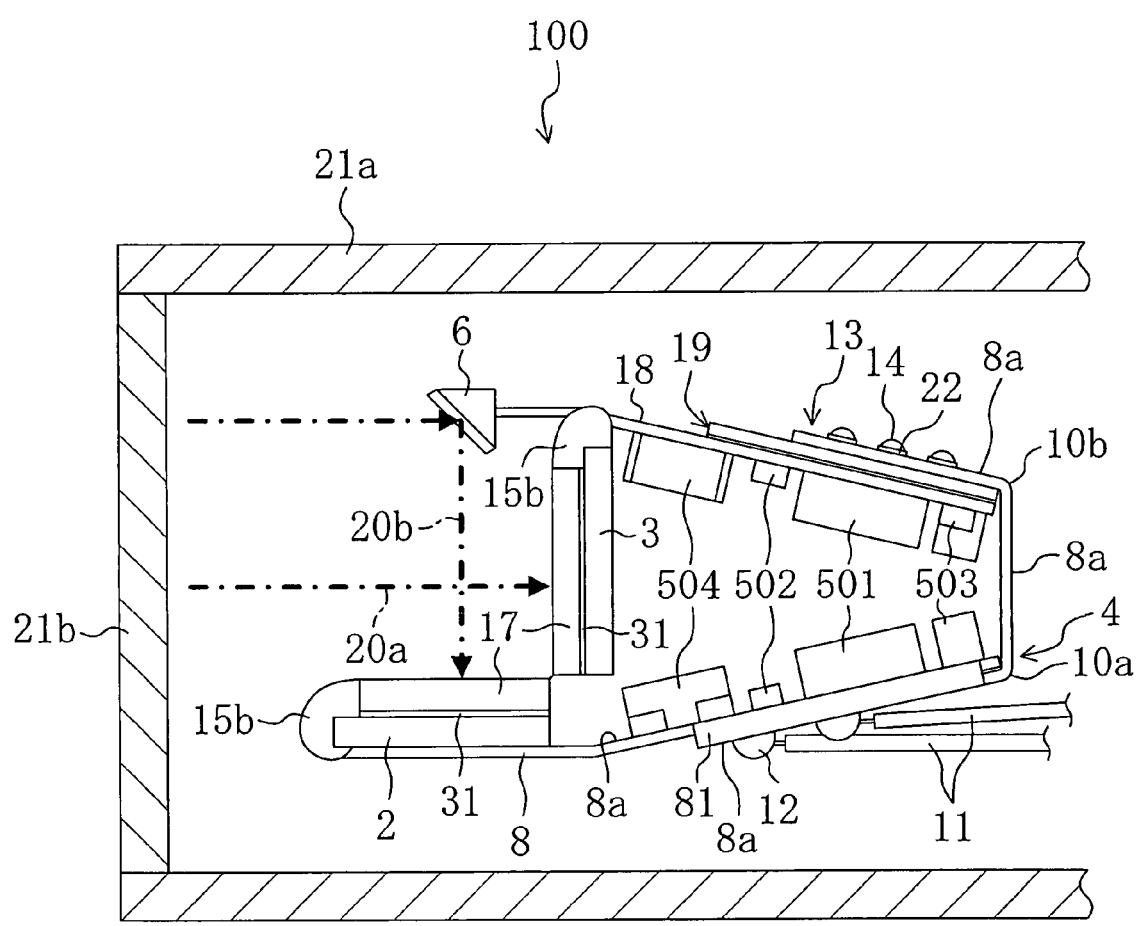
FIG. 5 is a partial cross sectional view of a camera unit of Embodiment 1.

FIG. 5 is a conceptual view showing the structure of a camera unit (an optical device unit) 100 having the solid-state image sensor 1 disposed in a rectangular tubular housing 21a, the tubular housing 21a and a cover glass 21b being shown in cross section.

The cover glass 21b is attached to a front end opening of the tubular housing 21a. The solid-state image sensor 1 is inserted from a back end opening (not shown) of the tubular housing 21a, with the solid-state image sensing devices 2 and 3 facing the front end opening. On the one hand light which enters the tubular housing 21a through the cover glass 21b directly impinges on the light receiving surface of the second solid-state image sensing device 3. On the other hand the light which enters the tubular housing 21a through the cover glass 21b is reflected by the mirror 6 and impinges on the light receiving surface of first solid-state image sensing device 2.

In the solid-state image sensor 1 of the present embodiment, each of the flexible substrates 8 and 18, inclusive of the bent portions, extending in a rear surface side of the second solid-state image sensing device 3 has a width substantially the same as that of a rear surface of the second solid-state image sensing device 3. Therefore, if the second solid-state image sensing device 3 is seen from a light receiving surface side, the mounted electronic components 5a are hidden behind the second solid-state image sensing device 3. Therefore, the solid-state image sensor 1 is very compact, and a camera unit 100 is also reduced in entire volume. Moreover, the cover glass 21b has an area slightly bigger than the light receiving surface of the second solid-state image sensing device 3. Therefore, when the solid-state image sensor 1 is inserted in the tubular housing 21a, clearance between the tubular housing 21a and the solid-state image sensor 1 is very small, and thus the solid-state image sensor 1 does not wobble in the camera unit 100. Therefore, it is possible to realize a compact and highly accurate camera.

In the present embodiment, two solid-state image sensing devices 2 and 3 are disposed adjacently to each other, and the mirror 6 brings an optical axis of the first solid-state image sensing device 2 orthogonal to an optical axis of the second solid-state image sensing device 3. The two flexible substrates 8 and 18 respectively connected to the solid-state image sensing devices 2 and 3 are connected to each other by bending the flexible substrate 8. Therefore, an external signal input and a power supply input are shared by the two solid-state image sensing devices 2 and 3 and drive circuits therefore, which makes it possible to reduce the number of components such as wires. Therefore, the solid-state image sensor 1 can be made compact and the fabrication cost can be saved. Moreover, to realize the connection of the two flexible substrates 8 and 18 to each other, solder reflow has only to be performed, with the substrate being folded such that the surfaces having the connection regions come in contact with each other. The connection does not influence on optical axis alignment of the solid-state image sensing devices 2 and 3. Therefore, it is possible to shorten the fabrication time and reduce cost. Moreover, the two flexible substrates 8 and 18 have flexibility and bend under force, which facilitates the workability of insertion into the tubular housing 21a.

Embodiment 2

A solid-state image sensor of Embodiment 2 is different from the solid-state image sensor 1 of Embodiment 1 in configuration of a connection portion between two flexible substrates. Connection configuration of the solid-state image sensing device to the flexible substrate, mounting configuration of the electronic components 5a, and the like are the same as those of Embodiment 1 and therefore, only the points different from Embodiment 1 are described below.

Figure 6A:
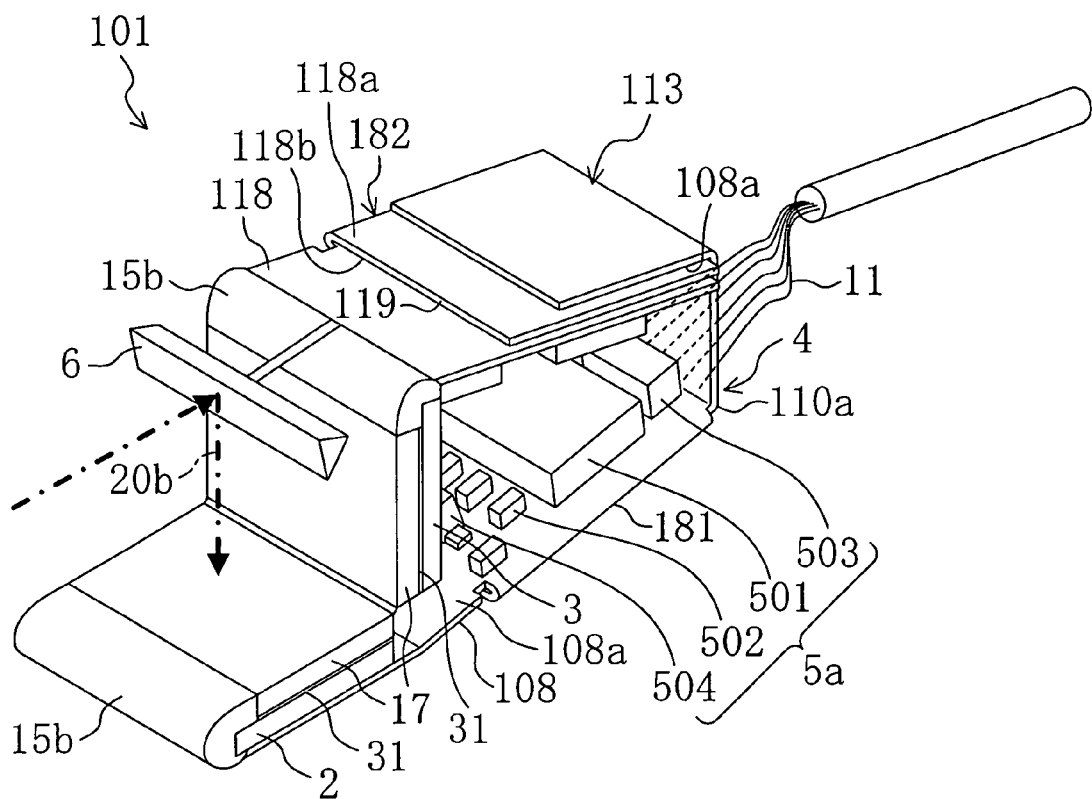
FIG. 6A is a perspective view of a solid-state image sensor of Embodiment 2.

FIG. 6A is a perspective view schematically showing a solid-state image sensor 101 of the present embodiment. A principal surface 108a of a first connection region 113 of a first flexible substrate 108 faces a second connection region 119 of a second flexible substrate 118. That is, the principal surface 108a of the first connection region 113 of the present embodiment faces an opposite direction to that in Embodiment 1.

Figure 6B:
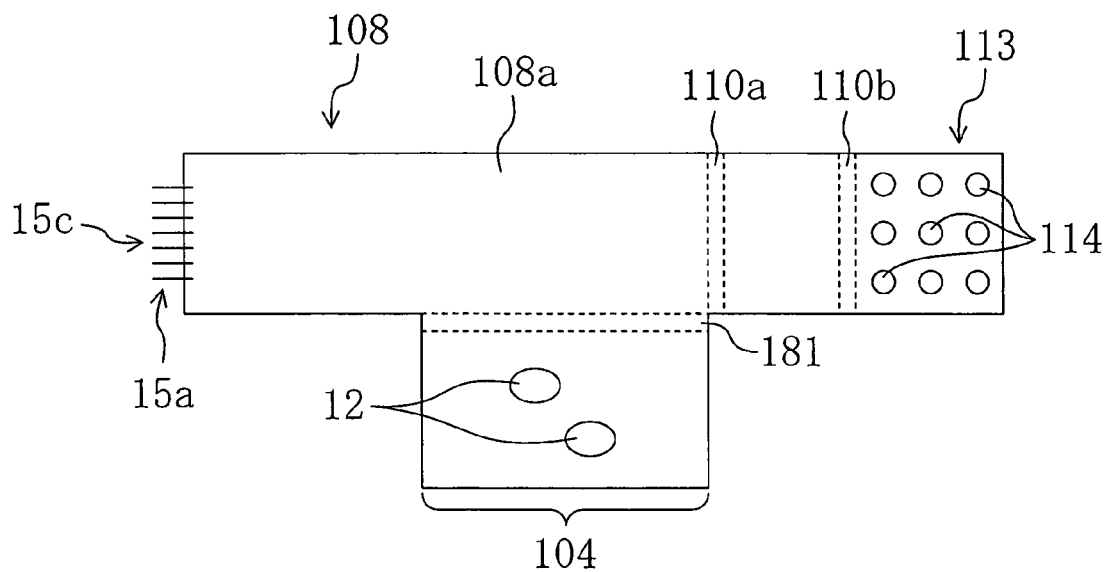
FIG. 6B is a developed view of a first flexible substrate of Embodiment 2.

FIG. 6B is a developed view showing a first flexible substrate 108 of the present embodiment. Unlike Embodiment 1, the present embodiment includes a strip-like substrate linearly extending from a contact terminal portion 15c connected to the solid-state image sensing device 2 to the first connection region 113. A region 104 formed by folding the first flexible substrate 108 continues from the first folding position 181 and is provided only at a side of a region where the electronic components 5a are mounted. A portion of the substrate extending to the first connection region 113 is folded at two positions, a first bending position 110a and a second bending position 110b, to form valley creases on the principal surface 108a. The principal surface 108a of the first connection region 113 is provided with a plurality of solder balls 114. The solder balls 114 are connected to the electronic components 5a and the external connection parts 12 via the metal wires (not shown).

Figure 7A:
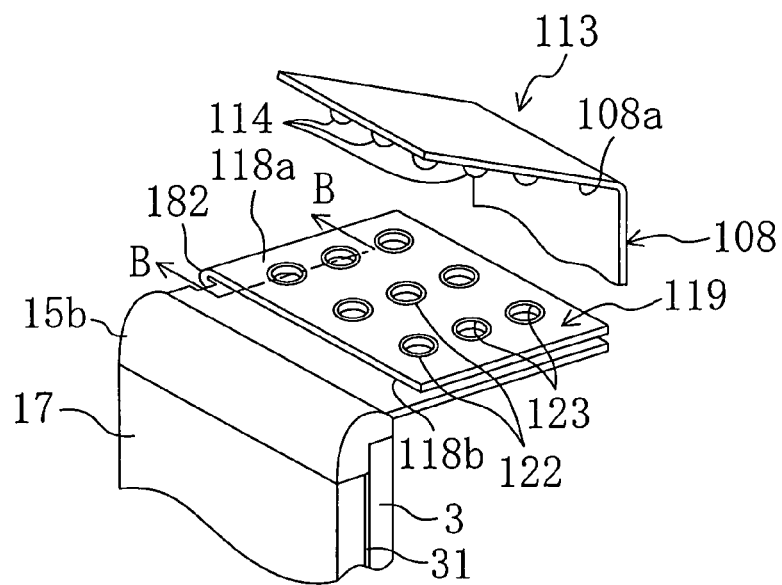
FIG. 7A is a perspective view schematically showing first and second flexible substrates of Embodiment 2 before connection to each other.
Figure 7B:
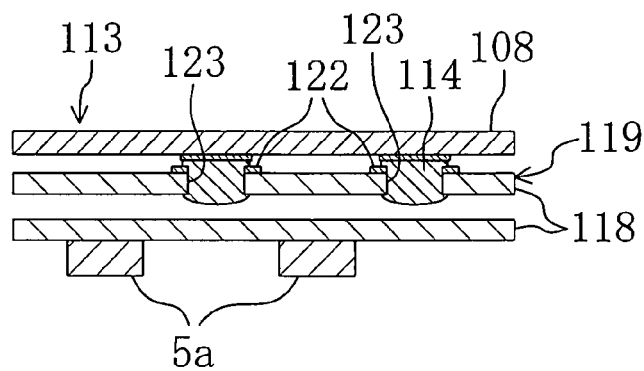
FIG. 7B is a cross sectional view after the connection taken along the line B-B of FIG. 7A.
Figure 7C:
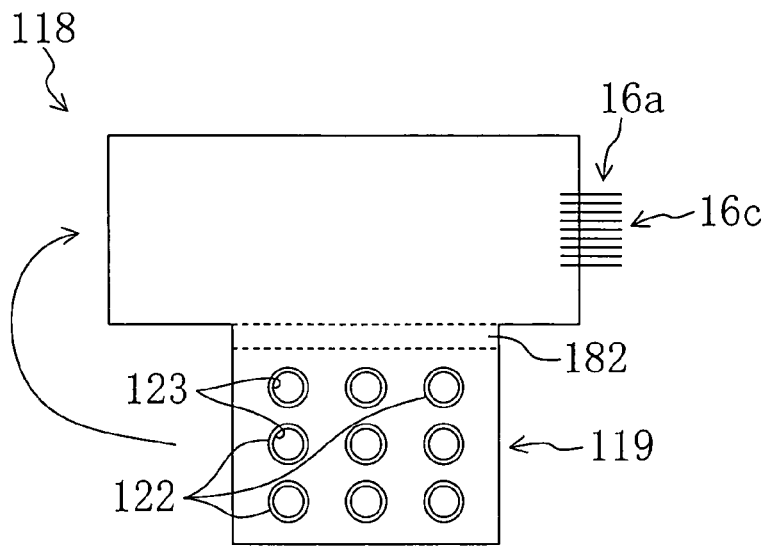
FIG. 7C is a developed view of the second flexible substrate.

Meanwhile, as shown in FIGS. 7A, 7B, and 7C, for connection to the first flexible substrate 108, a part of the second flexible substrate 118 is folded at a second folding position 182 such that surfaces (sub surfaces) 118b opposite to the principal surface 118a face each other. The second connection region 119, which is the folded part, is provided with a plurality of through-holes 123. In the periphery of the through-holes 123 on the principal surface 118a, ring electrodes 122 are formed. The above-mentioned points are different from Embodiment 1.

That is, in the present embodiment, a region having the solder balls and a region having the through-holes and ring electrodes are reversed compared to those of Embodiment 1. Therefore, connection steps and effects are the same as those of Embodiment 1.

Embodiment 3

A solid-state image sensor of Embodiment 3 is different from the solid-state image sensor 1 of Embodiment 1 in positions of two solid-state image sensing devices and that a prism is used instead of the mirror. These different points from Embodiment 1 are described below.

Figure 8A:
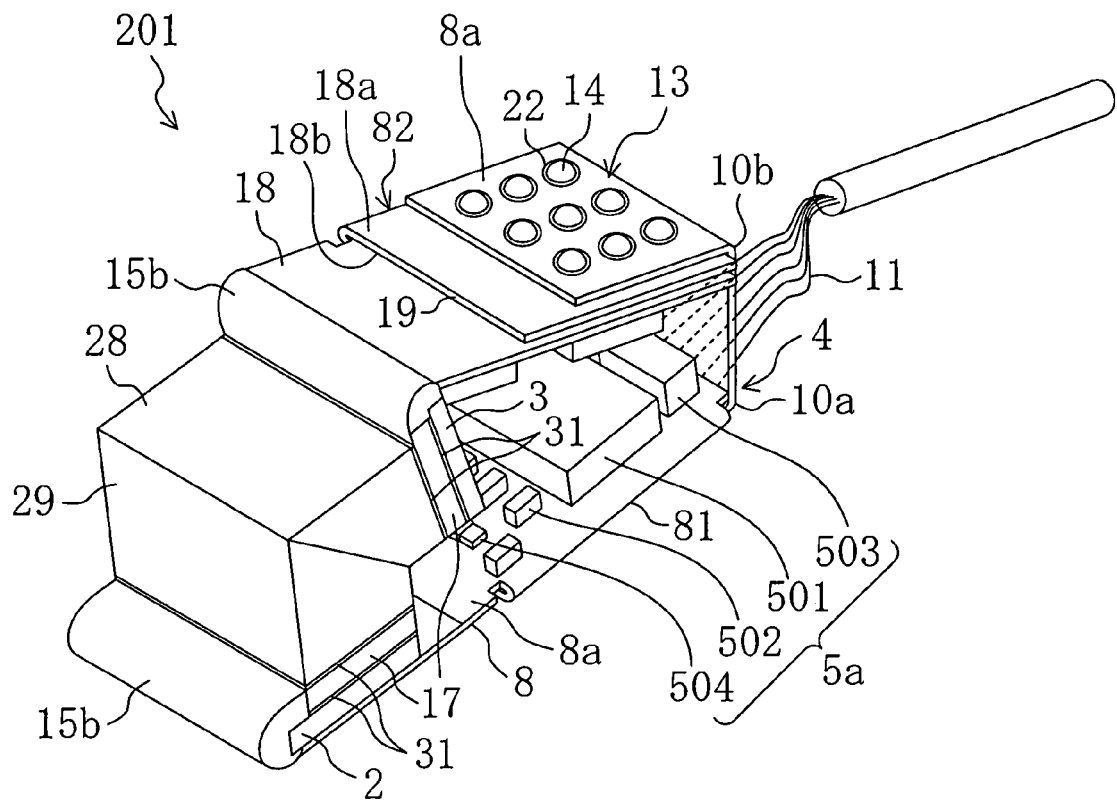
FIG. 8A is a perspective view and FIG. 8B is a side view schematically showing a solid-state image sensor of Embodiment 3.
Figure 8B:
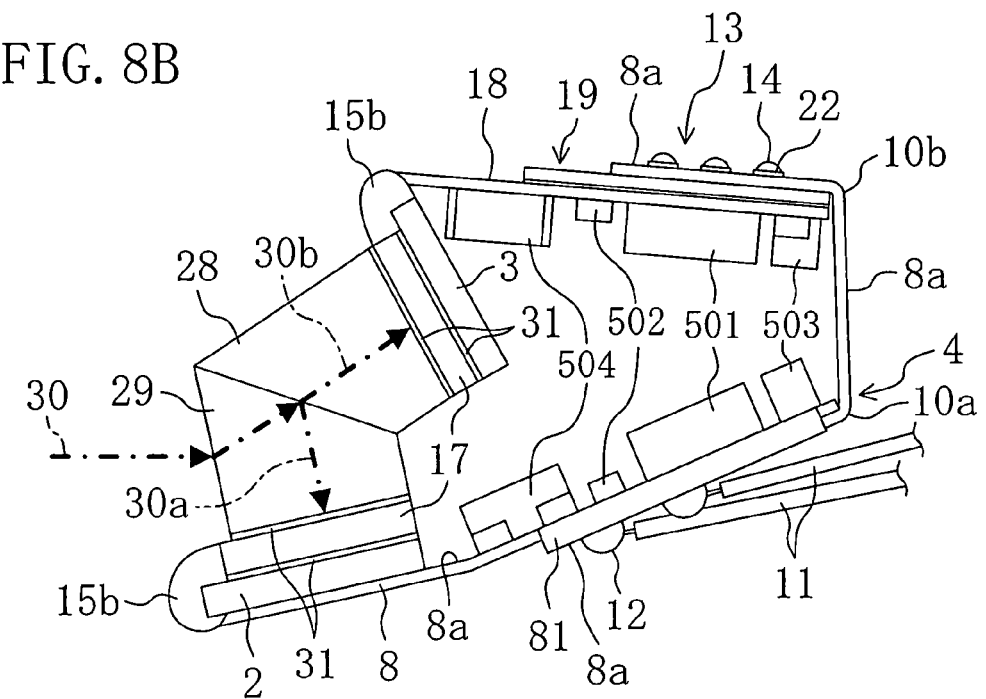

As shown in FIGS. 8A and 8B, a solid-state image sensor 201 of the present embodiment includes a first prism 29 and a second prism 28. One surface of the first prism 29 is adhered to the transparent protector 17 adhered to the first solid-state image sensing device 2. One surface of a second prism 28 is adhered to the transparent protector 17 adhered to the second solid-state image sensing device 3. The transparent protectors 17 are respectively adhered to the prisms 29 and 28 by the transparent adhesives 31. One surface of the first prism 29 and one surface of the second prism 28 are laid on each other and fixed.

The two prisms 29 and 28 are pillar-shaped and have trapezoidal cross sections. Surfaces forming oblique sides of the trapezoids are laid on each other. The two solid-state image sensing devices 2 and 3 are disposed adjacently to each other through the two prisms 29 and 28 and fixed. Two light receiving surfaces forms an angle of about 75°. The distance between the two solid-state image sensing devices 2 and 3 is shorter than the longest side of the light receiving surfaces of the solid-state image sensing devices 2 and 3.

Incident light 30 entering the solid-state image sensor 201 of the present embodiment is refracted by the two prisms 29 and 28 such that light having a first wavelength impinges on the first solid-state image sensing device 2 and light having a second wavelength impinges on the second solid-state image sensing device 3. That is, the angles and the reflection characteristics of the surfaces of the two prisms are set to predetermined angles and characteristics such that the incident light 30 enters the first prism 29, the light having the first wavelength is reflected on an interface between the two prisms 29 and 28 laid on each other and the light having the second wavelength penetrates through the interface between the two prisms 29 and 28 laid on each other. In this embodiment, the first solid-state image sensing device 2 is a CCD selectively sensing the light having the first wavelength, and the second solid-state image sensing device 3 is a CCD selectively sensing the light having the second wavelength. Thus, an optical axis of incident light 30a on the first solid-state image sensing device 2 and an optical axis of incident light 30b on the second solid-state image sensing device 3 are initially the same optical axis of the incident light 30, and the optical axis of the incident light 30 is changed by the two prisms 29 and 28 in separate directions.

In the present embodiment, the solid-state image sensing devices 2 and 3 are fixed by the prisms 29 and 28. Therefore, in addition to the effect obtained in Embodiment 1, the present embodiment produces the effect that optical axes of the two solid-state image sensing devices 2 and 3 are easily aligned with each other.

It is to be noted that the shape of the prisms is not limited to be trapezoidal in cross section, and may be triangular in cross section. Moreover, the angle formed by the light receiving surfaces is preferably between and including 70° and 110° to make the solid-state image sensor 201 itself compact.

Embodiment 4

An optical device module of Embodiment 4 has two light emitting elements attached to the solid-state image sensor 201 of Embodiment 3. The other configurations are the same as those of Embodiment 3, and thus only the different points from Embodiment 3 are described below.

Figure 9A:
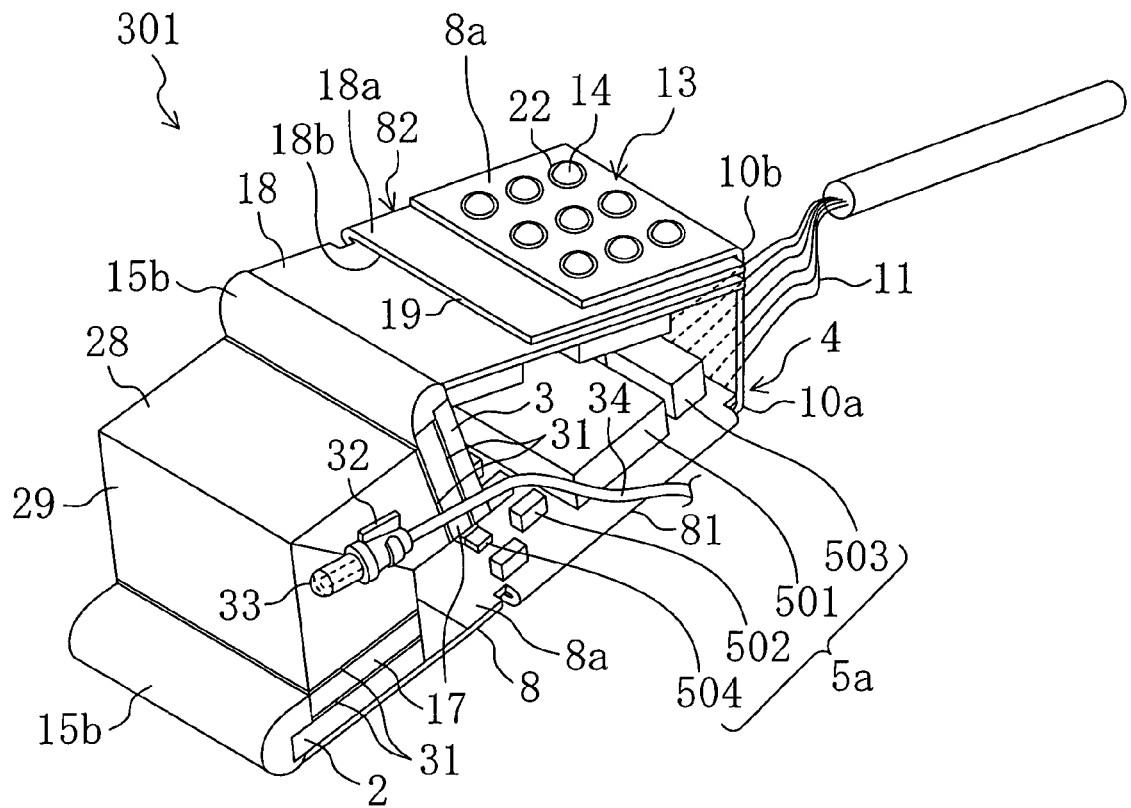
FIG. 9A is a perspective view and FIG. 9B is a side view showing an optical device module of Embodiment 4.
Figure 9B:
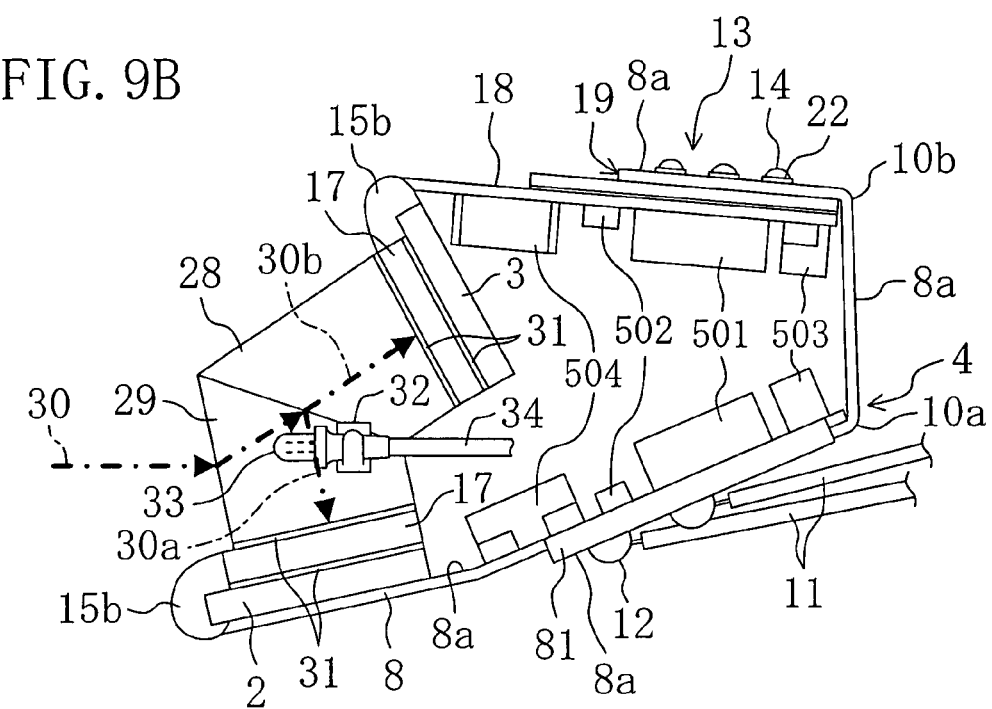

As shown in FIGS. 9A and 9B, an optical device module 301 of the present embodiment includes a light emitting diode 33, which serves as a light emitting element, attached to a prism side surface of the solid-state image sensor 201 of Embodiment 3. An optical axis of the light emitting diode 33 is aligned to be parallel to the optical axis of the incident light 30 impinging on the prism 29. It is to be noted that the prism side surface on which the light emitting diode 33 is attached is substantially perpendicular to a light incident surface of the prism 29. Light incident on the prism side surface does not arrive at the light receiving surfaces of the solid-state image sensing devices 2 and 3.

The light emitting diode 33 is attached to the prism side surface by a damper 32 and externally supplied with electric power via an electric power line 34 for light emission. It is to be noted that another light emitting diode is attached to the other side surface of the prisms 28 and 29, but it can not be seen in the drawing.

In the optical device module of the present embodiment, a light source and a camera are combined in one unit, which allows size reduction. Therefore, the optical device module can be inserted for search in narrow spaces where there is no light as in disaster sites or constructions buried under rubble or inside carved figures.

Embodiment 5

An optical device module of Embodiment 5 is provided by combining two solid-state image sensing devices and one laser element. It is to be noted that the optical device module of Embodiment 5 has partially the same configuration as that of Embodiments 2 and 3, and thus descriptions of the same configuration are omitted.

Figure 10A:
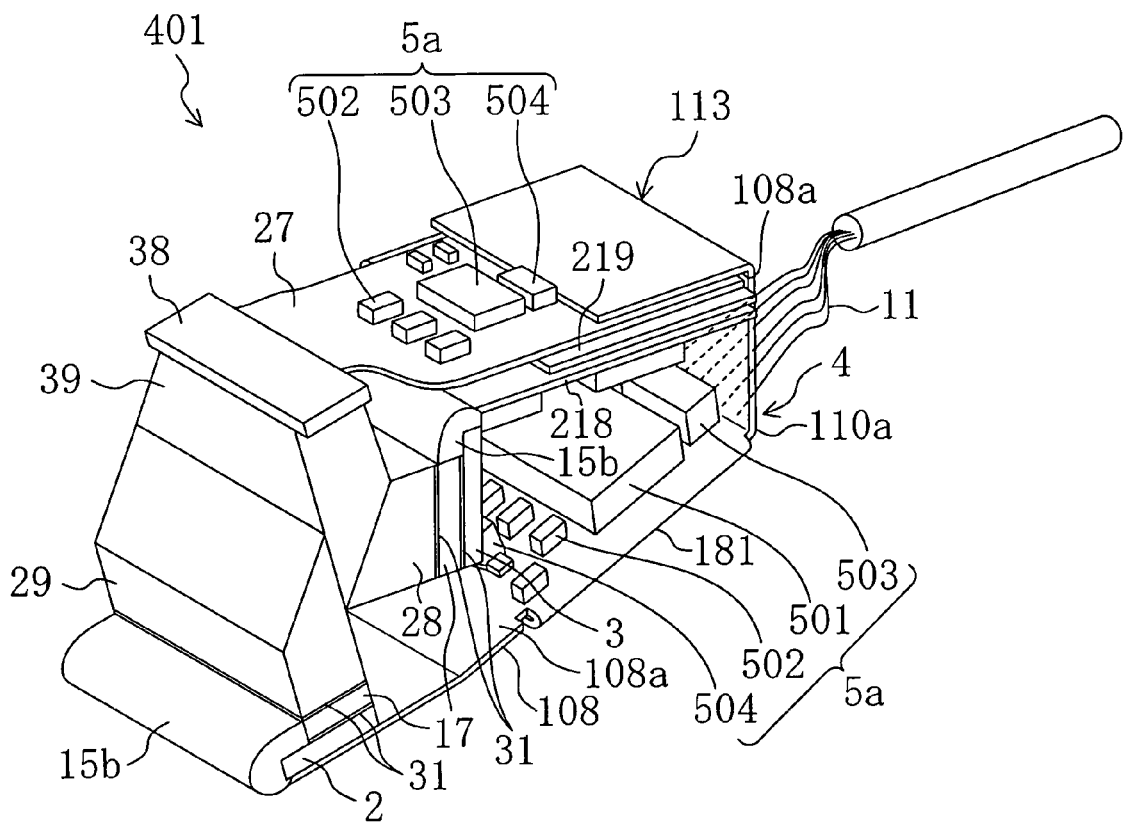
FIG. 10A is a perspective view and FIG. 10B is a side view schematically showing an optical device module of Embodiment 5.
Figure 10B:
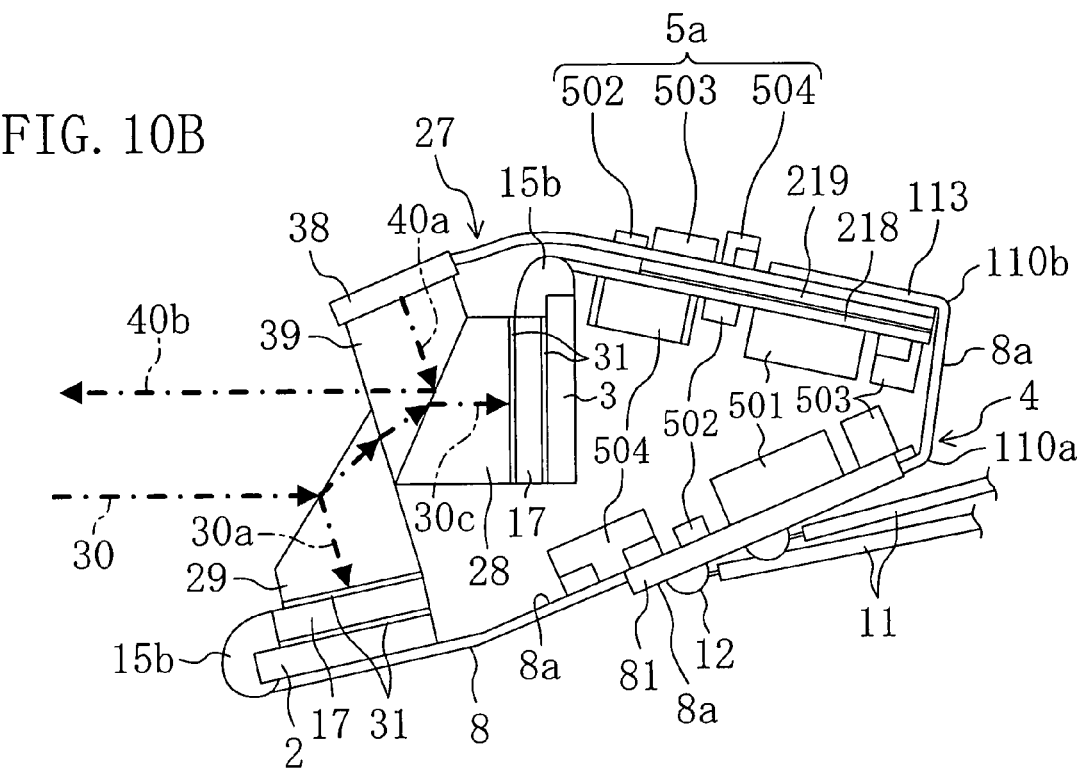

As shown in FIGS. 10A and 10B, an optical device module 401 of the present embodiment has a combination of three prisms 28, 29, and 39 through which the two solid-state image sensing devices 2 and 3 and a laser element 38 are disposed adjacently to one another and fixed. The first solid-state image sensing device 2 and the first flexible substrate 108 shown in a lower part of the drawings are the same as those of Embodiment 2. The second solid-state image sensing device 3 and the second flexible substrate 218 shown in an upper part of the drawings are the same as those of Embodiment 2 excepting a connection portion of the flexible substrates to one another. As in Embodiment 3, the first prism 29 is adhered to the first solid-state image sensing device 2, and the second prism 28 is adhered to the second solid-state image sensing device 3.

The present embodiment further includes a third flexible substrate 27 on the second flexible substrate 218. The third flexible substrate 27 is electrically connected to the laser element 38 for surface emission, and the electronic components 5a for driving the laser element 38 are mounted on the third flexible substrate 27. The third flexible substrate 27 is a single-sided wiring substrate also formed of a film carrier tape and includes metal wires (not shown) formed on its upward surface in the drawings. The electronic components 5a are mounted on the upward surface having the metal wires. An electrical connection between the laser element 38 and the third flexible substrate 27 is realized by a terminal (not shown) of the laser element 38 and a lead part (not shown) protruding from an end of the substrate 27. The connection portion may be provided with protection resin.

The three prisms 28, 29, and 39 are pillar-shaped prisms having trapezoidal cross sections. Surfaces forming oblique sides of the trapezoid of the third prism 39 and the second prism 28 are laid on each other. On the third prism 39, a light emitting surface of the laser element 38 is adhered. The second prism 28 is fixed to the second solid-state image sensing device 3 via the transparent protector 17. Meanwhile, a surface forming a bottom side of the trapezoid of the first prism 29 is laid on a surface forming a bottom side of the trapezoid of the third prism 39. In this configuration, as in Embodiment 3, incident light entering the first prism 29 is divided into two and refracted to change directions of optical axes such that light 30a having a first wavelength impinges on the first solid-state image sensing device 2 and light 30c having a second wavelength impinges on the second solid-state image sensing device 3. Meanwhile, light 40a output from the laser element 38 is reflected on an interface between the second and the third prisms 28 and 39 laid on each other and exits out of the optical device module 401 as exit light 40b. The exit light 40b has an optical axis parallel to the optical axis of the incident light 30 on the first prism 29.

Next, descriptions are given of a configuration of a connection portion of the three flexible substrates 108, 218, and 27 to one another.

Figure 11A:
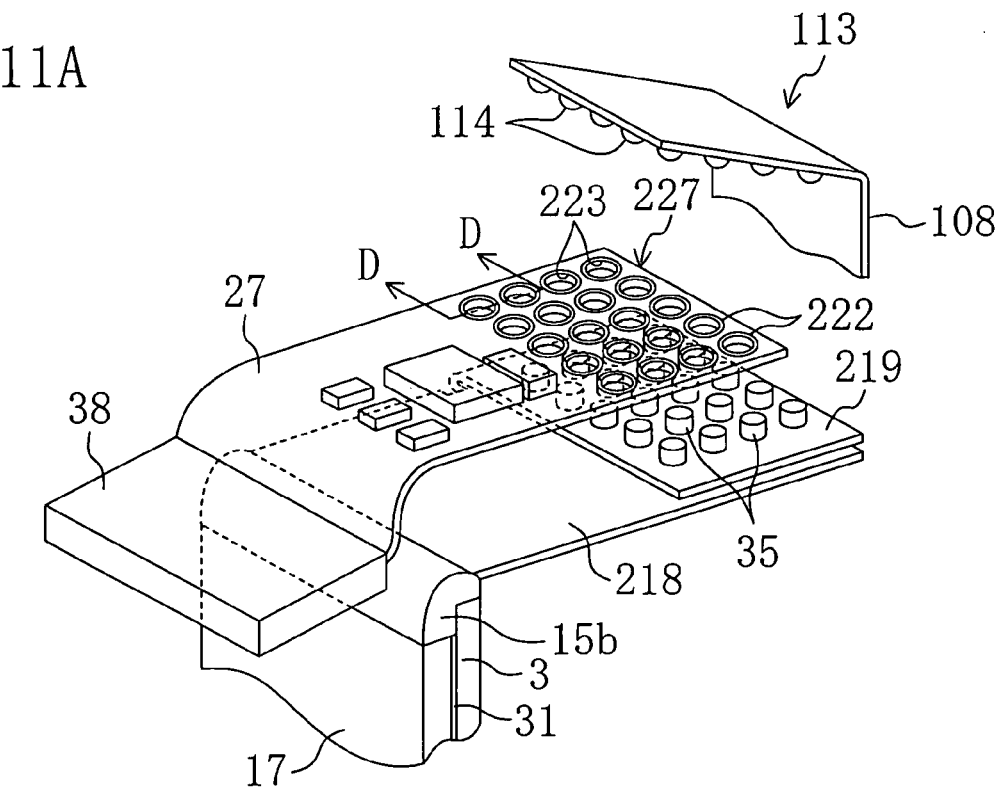
FIG. 11A is a perspective view schematically showing the first, second, and third flexible substrates of Embodiment 5 before connection to each other
Figure 11B:
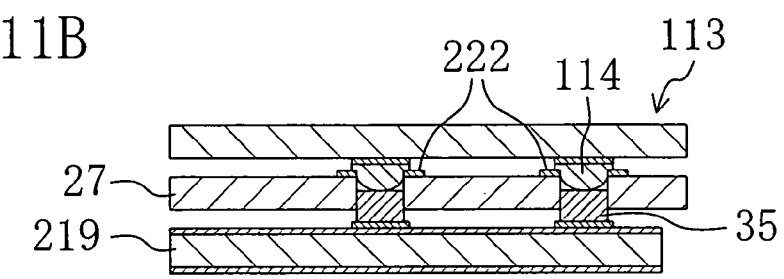
FIG. 11B is a cross sectional view after the connection taken along the line D-D of FIG. 11A.

As shown in FIGS. 11A and 11B, the three flexible substrates, i.e. the second flexible substrate 218, the third flexible substrate 27, and the first flexible substrate 108 are stacked in this order from the bottom and connected to one another. The second flexible substrate 218 is the same as the second flexible substrate 18 of Embodiment 1 excepting that bumps (Cu—Ni—Au posts) 35 instead of the solder balls are formed in the second connection region 219. Moreover, the first flexible substrate 108 is the same as that of Embodiment 2.

The third flexible substrate 27 has a third connection region 227 which is to be connected to the first connection region 113 and to the second connection region 219. The third connection region 227 is provided with a plurality of through-holes 223. On a principal surface (upper surface) of the third flexible substrate 27, ring electrodes 222 are provided in the periphery of the through-holes 223. Although it is not shown in the drawings, the ring electrodes 222 are connected to the electronic components 5a mounted on the third flexible substrate 27 and to the laser element 38 via the metal wires formed on the principal surface.

The first, third, and second connection regions 113, 227, and 219 are laid on one another, so that the solder balls 114 and the bumps 35 are inserted in the through-holes 223. Then, solder reflow is performed to electrically connect the solder balls 114, the ring electrodes 222 and the bumps 35 to one another.

At this time, another conductive material may be inserted in the through-holes 223 to electrically connect the solder balls 114, the ring electrodes 222, and the bumps 35 to one another.

In the present embodiment, the distance between the optical device module 401 and an object in a forward direction of the optical device module 401 can be measured such that light emitted from the laser element 38 impinges on the object in the forward direction of the optical device module 401 and returns to the solid-state image sensing devices 2 and 3, and the returning light is received by the solid-state image sensing devices 2 and 3. Laser light may be used as a light source.

In the present embodiment as in Embodiments 1 and 2, it is possible to compactly combine a plurality of optical devices with peripheral circuits thereof, and to easily and certainly connect the flexible substrates to one another. Thus, it is possible to fabricate such a compact optical device module at low cost.

Embodiment 6

An optical device module of Embodiment 6 has an LED chip instead of the laser element 38 of the optical device module 401 of Embodiment 5. Since the other configurations are the same as those of Embodiment 5, only the different points from Embodiment 5 are described below.

Figure 12A:
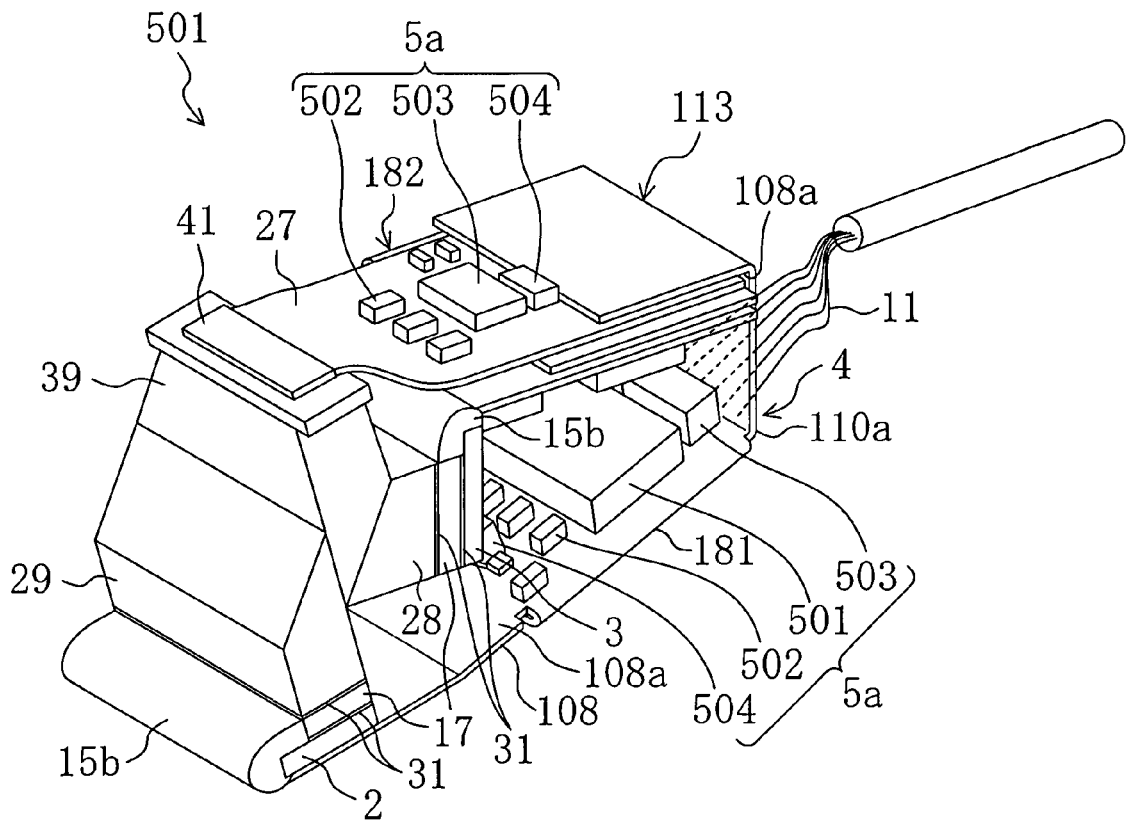
FIG. 12A is a perspective view and FIG. 12B is a side view schematically showing an optical device module of Embodiment 6.
Figure 12B:
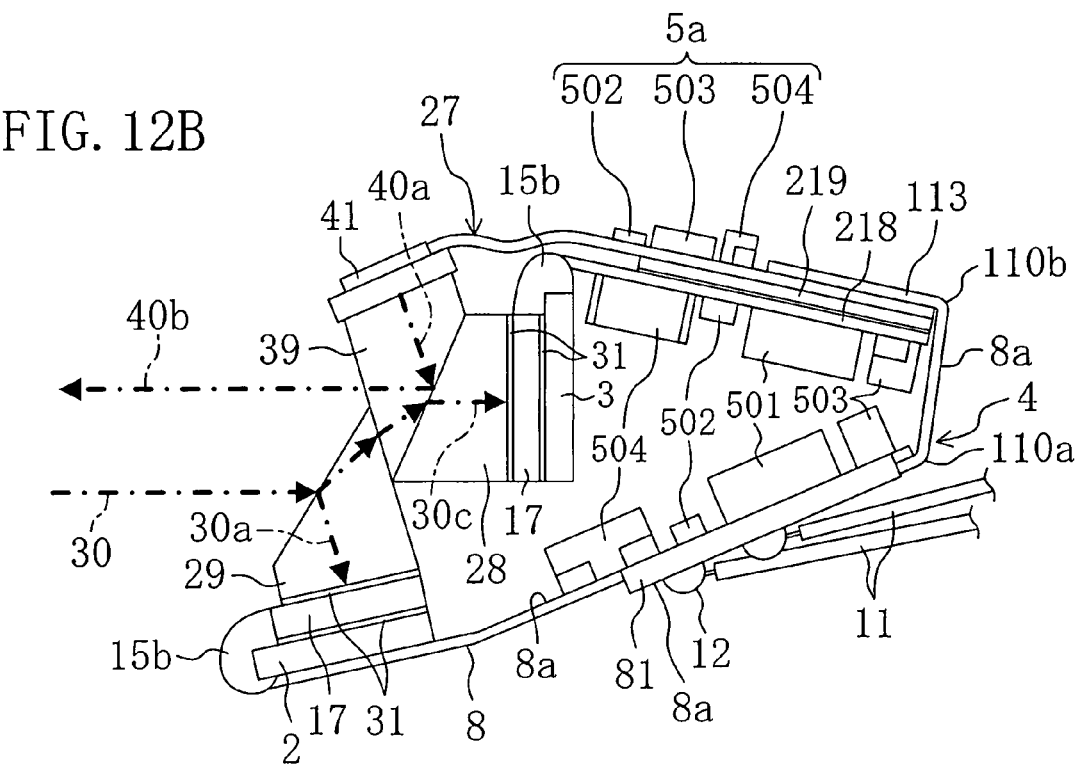

As shown in FIGS. 12A and 12B, an optical device module 501 of the present embodiment includes the two solid-state image sensing devices 2 and 3 as the optical device module 401 of Embodiment 5. In a place where the laser element 38 of Embodiment 5 is provided, an LED chip 41, which serves as a light emitting element, is provided instead of the laser element. In the present embodiment as in Embodiment 5, two light receiving elements and one light emitting element are compactly integrated, and the LED chip 41 serves as the light source to produce the same effects as those of Embodiment 5.

Embodiment 7

Figure 13:
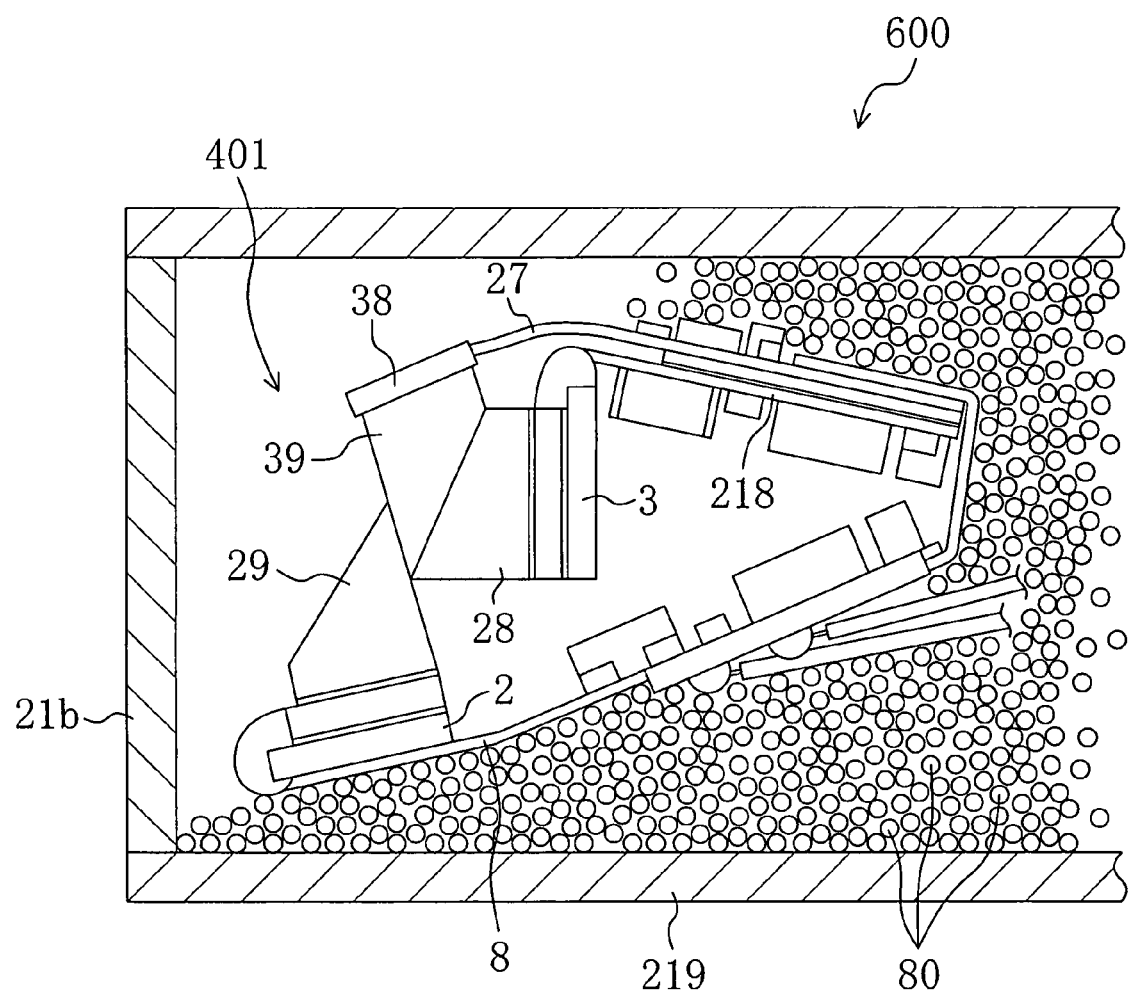
FIG. 13 is a cross sectional view of a camera unit of Embodiment 7.
Figure 14:
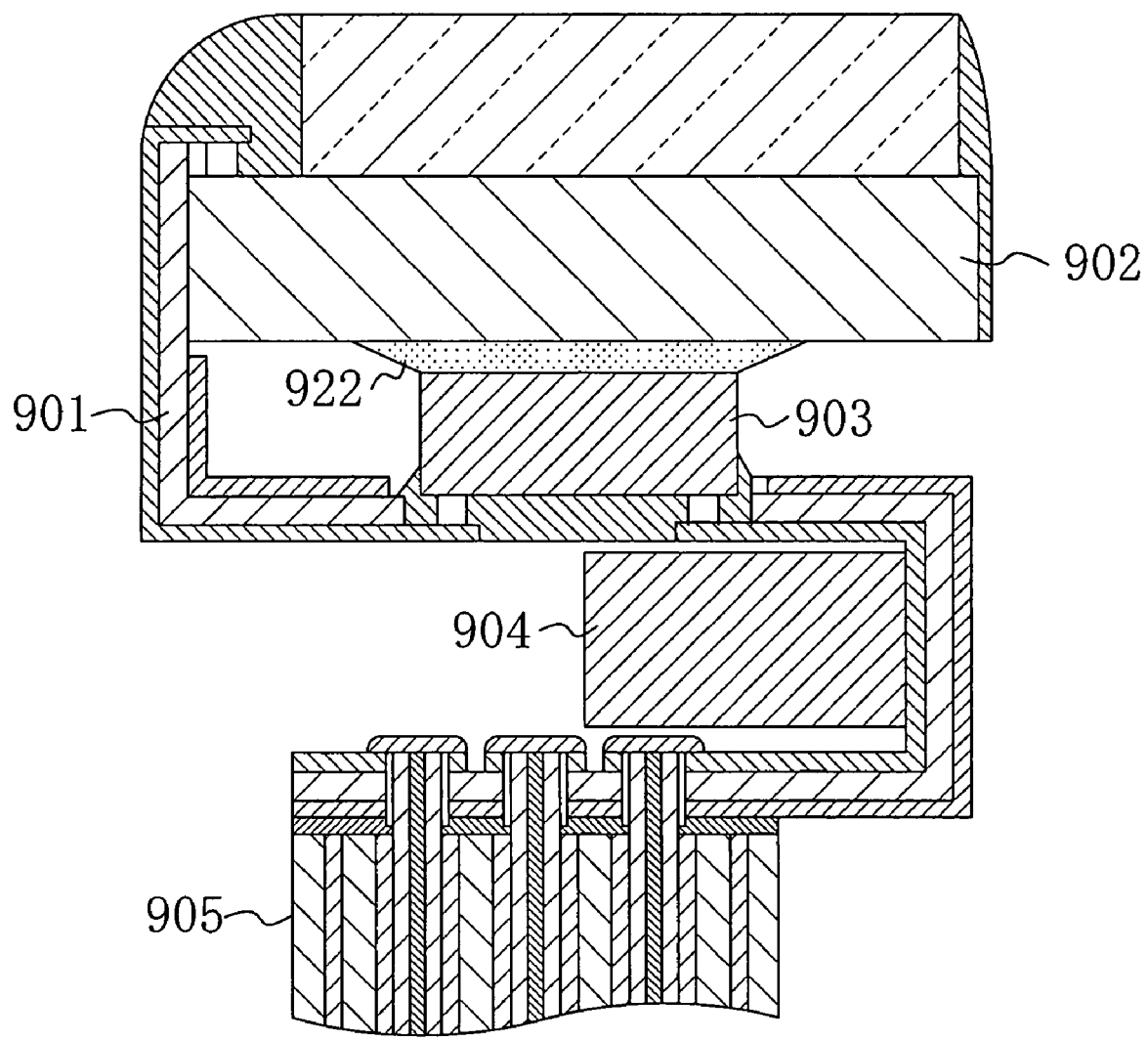
FIG. 14 is a view showing the configuration of a conventional solid-state image sensor.

FIG. 13 is a partial cross sectional view of a camera unit (an optical device unit) 600 of Embodiment 7. The camera unit 600 includes the optical device module 401 of Embodiment 5 provided in the rectangular tubular housing 21a. In FIG. 13, the tubular housing 21a and the cover glass 21b are shown in cross section. As the camera unit 100 of Embodiment 1, when the optical device module 401 is inserted in the tubular housing 21a, clearance between the tubular housing 21a and the optical device module 401 is very small, and thus the optical device module 401 does not wobble in the camera unit 600.

The tubular housing 21a and the cover glass 21b of the camera unit 600 of the present embodiment are the same as the tubular housing 21a and the cover glass 21b of Embodiment 1 and therefore, a description thereof is not given.

The camera unit 600 of the present embodiment is fabricated by putting a granular heat liberation material 80 into the tubular housing 21a in inserting the optical device module 401 into the tubular housing 21a. The heat liberation material 80 occupies almost all of the inner spaces of the tubular housing 21a other than the space occupied by the optical device module 401. The heat liberation material 80 acts to quickly transmit heat produced by the solid-state image sensing devices 2 and 3, the laser element 38 and the electronic components 5a to the tubular housing 21a to release it, thereby preventing the temperature of the optical device module 401 from being excessively raised. Therefore, in the present embodiment, the reliability of the camera unit 600 can be enhanced. The heat liberation material 80 has electrical insulation at least at its surface, which prevents the optical device module 401 from being short-circuited. Examples of the heat liberation material 80 used includes Al whose surface is subjected to electric insulating treatment and a Cu alloy. The heat liberation material has a heat conductivity 100 times or more that of air at normal temperature. The heat liberation material 80 may be in granular form or a lump of wire wool such as steel scrubbing brush.

Other Embodiments

The embodiments described above are illustrative only and the present invention is not limited to these embodiments. For example, the solid-state image sensing device is not limited to the CCD and may be a static induction transistor image sensing device (SIT) or a charge modulation image sensing device (CMD). Moreover, as the optical device, a laser or an LED may be used in addition to the solid-state image sensing device. That is, a plurality of light emitting elements may be combined.

Features of the embodiments may be combined. For example, the connection configuration of the flexible substrates of Embodiment 2 may be adopted into Embodiment 3.

Positions of the external connection parts 12 are not limited in the surface opposite to the surface of the first flexible substrate where the electronic components are mounted. The external connection parts 12 may be provided on the second or the third flexible substrate, or may be provided on the first flexible substrate between the first bending position and the second bending position.

The flexible substrate is not limited to the single-sided wiring or double-sided wiring film carrier tape and may be a single-sided or double-sided wiring flexible substrate other than the film carrier tape, or a flexible substrate formed of three laminated layers.

To connect more than one or two flexible substrates to one another, more than one or two flexible substrates may be bent for connection, other than bending only one flexible substrate for connection.

In Embodiments 5 through 7, any shapes and positions of the three prisms may be possible as long as light entering the optical device module substantially perpendicularly impinges on the light receiving surfaces of the solid-state image sensing devices, and light exiting out of the optical device module has an optical axis parallel to that of a component of light entering the optical device module (light which is to enter the solid-state image sensing devices).

Figure 15:
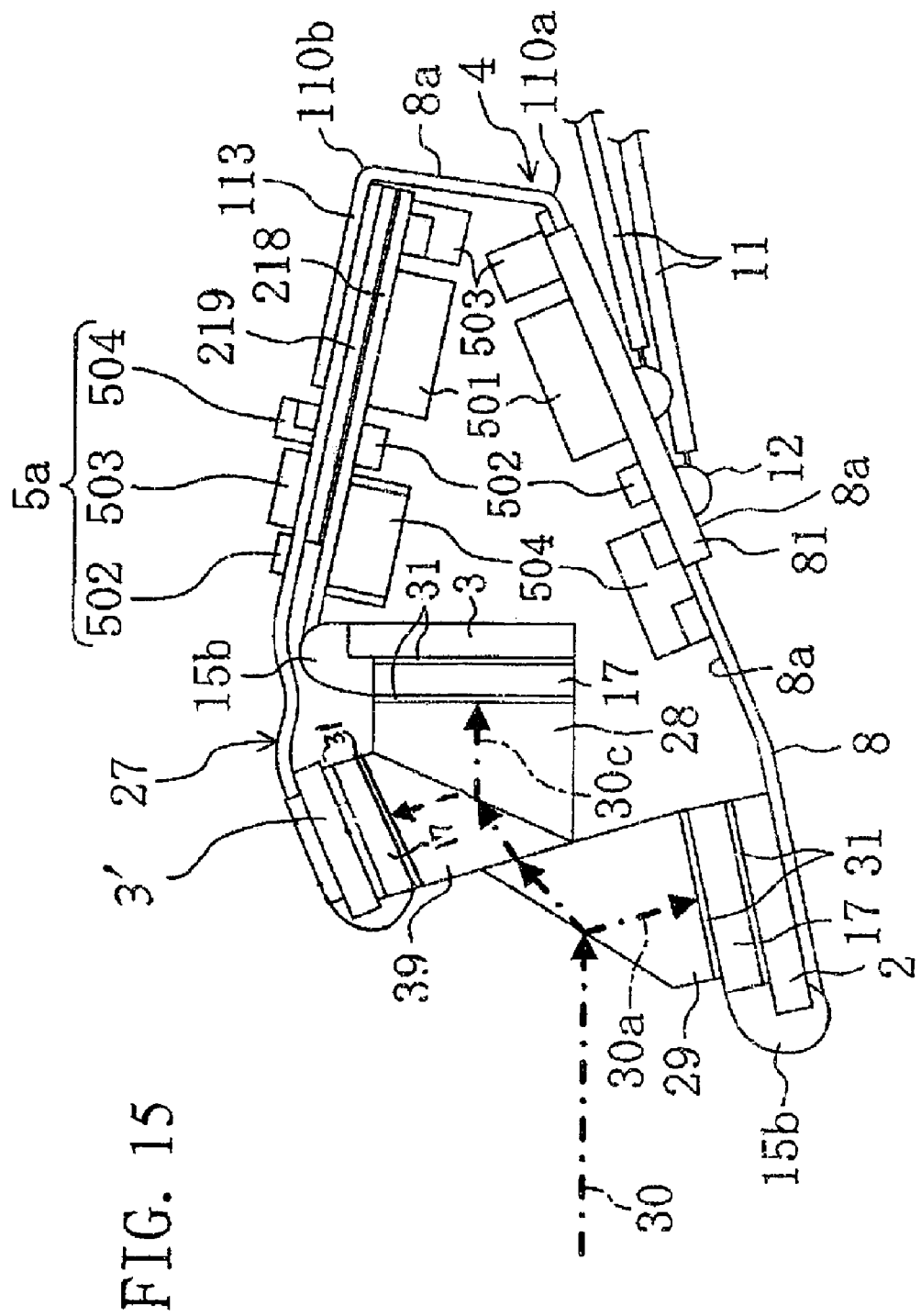
FIG. 15 illustrates a third solid-state image sensing device, which can be utilized, for example, in Embodiments 5-7.

Moreover, in Embodiments 5 through 7, a third solid-state image sensing device may be used instead of the laser element 38 or the LED chip 41. FIG. 15 illustrates such a third solid-state image sensing device 3'. In this case, it is preferable that three solid-state image sensing devices have characteristics of sensing three primary colors respectively. This makes it possible to form a full-color camera unit. Moreover, in addition to the three solid-state image sensing devices, the light emitting diode may be attached to the prism as Embodiments 3 and 4.

The optical device module of the present invention includes a plurality of optical devices adjacent to each other, wherein the direction of an optical axis of at least one of the optical devices is changed by a mirror or prism to be parallel to an optical axis of the other optical devices, and the flexible substrates connected to the optical devices are connected to each other by bending part of the flexible substrates. Therefore, the optical device module including the plurality of optical devices can be made compact as a whole at a low fabrication cost.

What is claimed is:

1. An optical device module comprising:
   a plurality of optical devices including a first solid-state image sensing device and a second solid-state image sensing device;
   a flexible substrate connected to the optical devices;
   an electronic component mounted on the flexible substrate; and
   a mirror or prism for changing a direction of an optical axis of at least one of the optical devices, wherein
   the flexible substrate includes a plurality of flexible substrates connected to different ones of the optical devices,
   the plurality of optical devices are adjacent to each other,
   the direction of the optical axis of the at least one of the optical devices changed by the mirror or prism is parallel to an optical axis of the other optical device,
   at least one of the flexible substrates is bent to be electrically connected to the other flexible substrate,
   a first prism is fixed on a light receiving surface of the first solid-state image sensing device,
   a second prism is fixed on a light receiving surface of the second solid-state image sensing device, and
   the first and second prisms are fixed to each other.

2. The optical device module of claim 1, further comprising a light emitting element,
   wherein an optical axis of light generated by the light emitting element and exiting out of the optical device module is parallel to an optical axis of a component of light entering at least one of the first and second prisms from the outside of the optical device module which is to enter the first and second solid-state image sensing devices in a direction parallel to optical axes of the first and second solid-state image sensing devices.

3. The optical device module of claim 1, wherein
   the plurality of optical devices further include a third solid-state image sensing device,
   another one of the flexible substrates is connected to the third solid-state image sensing device,
   a third prism is fixed on a light receiving surface of the third solid-state image sensing device, and
   the third prism is fixed to at least one of the first prism and the second prism.

4. The optical device module of claim 3, further comprising a light emitting element,
   wherein an optical axis of light generated by the light emitting element and exiting out of the optical device module is parallel to an optical axis of a component of light entering at least one of the first, second, and third prisms from the outside of the optical device module which is to enter the first, second, and third solid-state image sensing devices in a direction parallel to optical axes of the first, second, and third solid-state image sensing devices.

5. The optical device module of claim 1, wherein transparent protectors are provided between the light receiving surfaces of the solid-state image sensing devices and the prisms.

6. The optical device module of claim 1, wherein reinforcing resin is provided on connection portions of the optical devices to the flexible substrates.

7. The optical device module of claim 1, wherein each of the flexible substrates is formed of a film carrier tape and at least a film is removed from connection portions of the optical devices to the flexible substrates.

8. The optical device module of any one of claims 1 and 2 through 7, wherein
at least one of the plurality of flexible substrates electrically connected to each other includes a bump electrode formed of a solder, and
another one of the flexible substrates includes a through-hole in which the bump electrode is to be inserted.

9. The optical device module of claim 8, wherein part of said another one of the flexible substrates is folded, and the folded part has the through-hole.

10. The optical device module of claim 8, wherein part of said another one of the flexible substrates is folded, and the folded part has the bump electrode.

11. The optical device module of claim 8, wherein an electrode provided on another one of the flexible substrates is electrically connected to the bump electrode.

12. The optical device module of claim 8, wherein the flexible substrates are single-sided wiring substrates each having wiring only on one surface.

13. The optical device module of claim 12, wherein
part of at least one of the flexible substrates is folded such that surfaces where the wiring is not provided are laid on each other, and
the folded part of the at least one of the flexible substrates has an external connection part for external connection.

14. An optical device unit comprising:
the optical device module of claim 1; and
a housing for accommodating the optical device module.

15. The optical device unit of claim 14, wherein the housing accommodates a heat liberation material at least the surface of which has electrical insulation.

16. The optical device module of claim 1, wherein the flexible substrate connected to the first solid-state image sensing device is bent to be electrically connected to the flexible substrate connected to the second solid-state image sensing device.

17. The optical device module of claim 1, wherein
incident light includes light having a first wavelength and light having a second wavelength,
the light having the first wavelength is reflected on an interface between the first prism and the second prism to enter the first solid-state image sensing device, and
the light having the second wavelength penetrates through the interface to enter the second solid-state image sensing device.

* * * * *